United States Patent
Tsumagari

(10) Patent No.: US 12,515,493 B2
(45) Date of Patent: Jan. 6, 2026

(54) AIR CONDITIONER FOR VEHICLE

(71) Applicant: DENSO CORPORATION, Kariya (JP)

(72) Inventor: Yuuki Tsumagari, Kariya (JP)

(73) Assignee: DENSO CORPORATION, Kariya (JP)

( * ) Notice: Subject to any disclaimer, the term of this patent is extended or adjusted under 35 U.S.C. 154(b) by 680 days.

(21) Appl. No.: 17/875,077

(22) Filed: Jul. 27, 2022

(65) Prior Publication Data

US 2022/0363106 A1 Nov. 17, 2022

Related U.S. Application Data

(63) Continuation of application No. PCT/JP2021/010053, filed on Mar. 12, 2021.

(30) Foreign Application Priority Data

Mar. 12, 2020 (JP) .................................. 2020-043251

(51) Int. Cl.
*B60H 1/00* (2006.01)
*B60H 3/06* (2006.01)

(52) U.S. Cl.
CPC ....... *B60H 1/00564* (2013.01); *B60H 3/0616* (2013.01)

(58) Field of Classification Search
CPC .............. B60H 1/00564; B60H 3/0616; B60H 2003/065; F24F 13/28

USPC ......................................................... 454/156
See application file for complete search history.

(56) References Cited

U.S. PATENT DOCUMENTS

2013/0160648 A1* 6/2013 Spryshak ........... B01D 46/0009
55/320

FOREIGN PATENT DOCUMENTS

JP        2012236437 A   * 12/2012
JP           6544729 B2     7/2019

* cited by examiner

*Primary Examiner* — Steven B Mcallister
*Assistant Examiner* — Charles R Brawner
(74) *Attorney, Agent, or Firm* — Harness, Dickey & Pierce, P.L.C.

(57) ABSTRACT

An air conditioner for a vehicle includes: a case that forms an air passage; and a filter arranged inside the case. The case has an opening for attaching/detaching the filter. The case has a guide unit provided on an inner wall surface of the case to guide a movement of the filter. The guide unit has a positioning portion to determine a position of the filter in a filter mounted state, and a service portion located between the positioning portion and the opening. The case has a water prevention rib protruding from the inner wall surface so as to extend in a direction intersecting a flow of air at a position upstream of the service portion.

10 Claims, 16 Drawing Sheets

AIR CONDITIONER FOR VEHICLE

CROSS REFERENCE TO RELATED APPLICATIONS

The present application is a continuation application of International Patent Application No. PCT/JP2021/010053 filed on Mar. 12, 2021, which designated the U.S. and claims the benefit of priority from Japanese Patent Application No. 2020-043251 filed on Mar. 12, 2020. The entire disclosures of all of the above applications are incorporated herein by reference.

TECHNICAL FIELD

The present disclosure relates to an air conditioner for a vehicle.

BACKGROUND

An air conditioner for a vehicle includes a filter that purifies air inside a case that forms an air passage. The case has a guide unit and an opening. The guide unit holds the filter, and guides the movement of the filter when the filter is attached/detached to/from the case.

SUMMARY

According to an aspect of the present disclosure, an air conditioner for a vehicle includes: a case that forms an air passage; and a filter arranged inside the case. The case has an opening for attaching/detaching the filter. The case has a guide unit provided on an inner wall surface of the case to guide a movement of the filter. The guide unit has a positioning portion to determine a position of the filter, and a service portion located between the positioning portion and the opening to increase a flexibility in a posture of the filter. The case has a water prevention rib protruding from the inner wall surface so as to extend in a direction intersecting a flow of air at a position upstream of the service portion.

DESCRIPTION OF EMBODIMENTS

Figure 1:
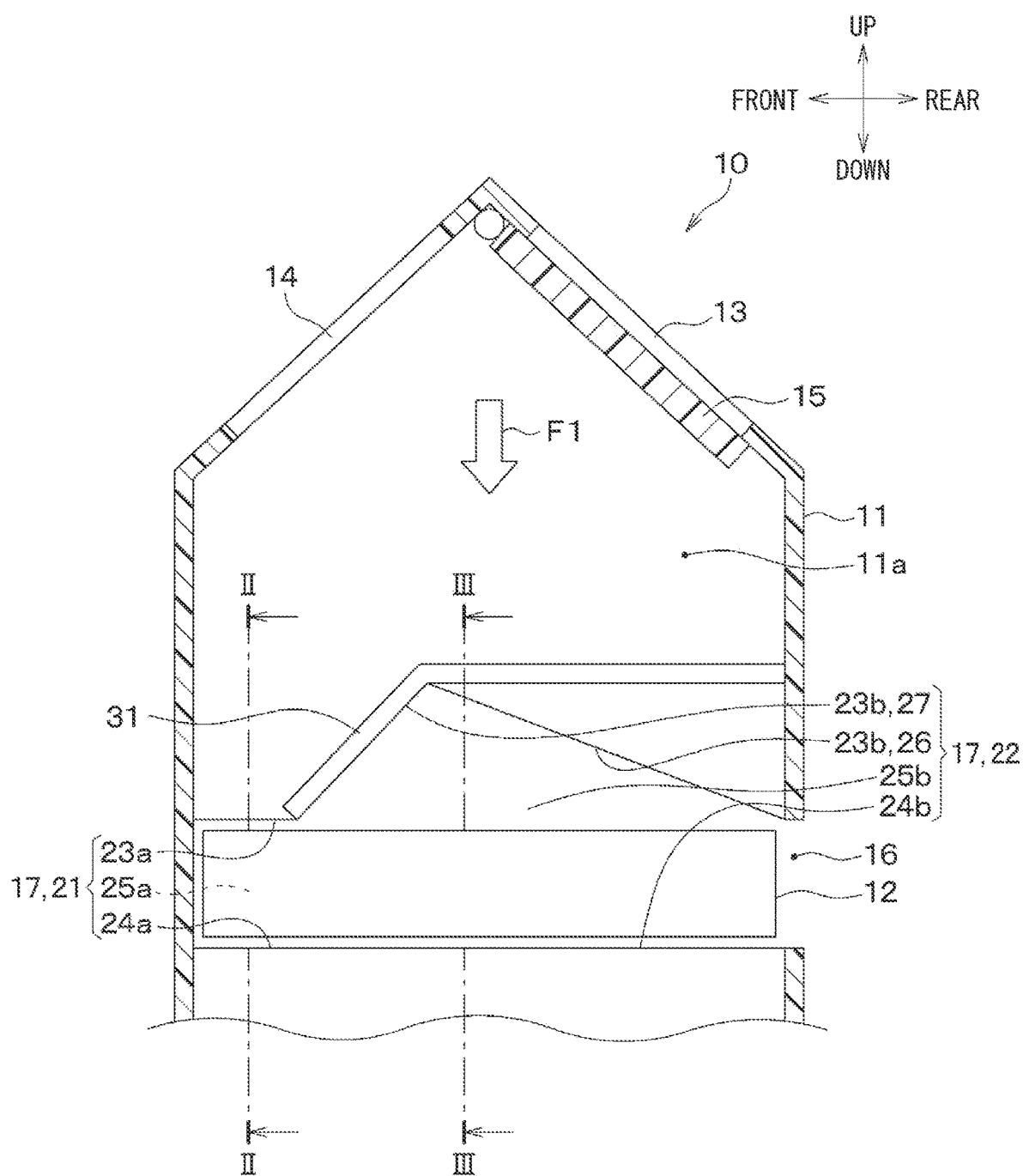
FIG. 1 is a cross-sectional view illustrating an air conditioner for a vehicle according to a first embodiment.

To begin with, examples of relevant techniques will be described.

An air conditioner for a vehicle includes a filter that purifies air inside a case that forms an air passage. The case has a guide unit and an opening. The guide unit holds the filter in a filter mounted state where the filter is fixed in the case, and guides the movement of the filter when the filter is being attached/detached to/from the case. The filter passes through the opening when the filter is being attached/detached.

The guide unit includes a positioning portion located away from the opening and a service portion located between the opening and the positioning portion. The positioning portion determines the position of the filter in the air flow direction in the filter mounted state. The service portion improves the serviceability of filter attachment/detachment. That is, the service portion improves the workability of the filter attachment/detachment by increasing the degree of freedom in the posture of the filter when the filter is being attached/detached.

Specifically, each of the positioning portion and the service portion has an upstream guide surface, a downstream guide surface, and a side guide surface. The upstream guide surface is in contact with a filter upstream portion, which is a portion of the filter on the upstream side in the air flow. The downstream guide surface is in contact with a downstream portion of the filter, which is a portion of the filter on the downstream side in the air flow. The side guide surface is in contact with a side of the filter.

The distance between the upstream guide surface and the downstream guide surface in the service portion is wider than the distance between the upstream guide surface and the downstream guide surface in the positioning portion. Therefore, when the filter is being attached/detached, the posture of the filter can be tilted with respect to the posture of the filter in the filter mounted state. This makes it possible to improve the workability of attaching/detaching the filter. The positioning portion and the service portion are composed of a recess formed on the inner wall surface of the case. The side guide surface corresponds to a bottom surface of the recess. The upstream guide surface and the downstream guide surface correspond to a side surface of the recess.

If water enters the case from the outside of the vehicle, the water flows along the inner wall surface of the case provided with the guide unit toward the filter from the upstream side of the filter. In some cases, a large gap is generated between the upstream guide surface of the service portion and the filter in the filter mounted state. The large gap is a space upstream of the filter facing the side guide surface of the service portion.

Therefore, the water flows between the side surface of the filter and the side guide surface of the service portion after flowing along the side guide surface. As described above, the present inventor has found an issue that water flows to the downstream side of the filter without passing through the filter.

The water that has entered the case from outside the vehicle contains a foreign matter such as dust. If this water flows to the downstream side in the case without passing through the filter, the drain hole may be clogged due to the accumulation of foreign matter and an offensive odor will be generated. If the foreign matter adheres to a heat exchanger, corrosion of the heat exchanger may be generated.

The above-mentioned issue is generated, regardless of the shape of the service portion, when there is a gap between the upstream guide surface of the service portion and the filter, and when the guide unit protrudes outward of the case, such that the position of the side guide surface is located outward than the inner wall surface of the case, where the guide unit is formed, upstream of the service portion.

The present disclosure provides an air conditioner for a vehicle, in which water that has entered the case from outside of the vehicle can pass through the filter while flowing along the inner wall surface of the case.

According to one aspect of the present disclosure, an air conditioner for a vehicle includes: a case that forms an air passage inside; and a filter arranged inside the case to cross the air passage. The case has an opening for attaching/detaching the filter to/from the case. The case has a guide unit to guide a movement of the filter when the filter is being detached from/attached to the case and to hold the filter during a filter mounted state while the filter is fixed in the case. The guide unit is provided on an inner wall surface of the case. The guide unit has a positioning portion distanced from the opening to determine a position of the filter in the mounted state, and a service portion located between the positioning portion and the opening to increase a flexibility in a posture of the filter when the filter is being detached from/attached to. Each of the positioning portion and the service portion has an upstream guide surface to be in contact with an upstream portion of the filter when the filter is being attached or detached, or in the mounted state, a downstream guide surface to be in contact with a downstream portion of the filter when the filter is being attached or detached or in the mounted state, and a side guide surface to be in contact with a side portion of the filter when the filter is being attached or detached, or in the mounted state. The inner wall surface of the case has an upstream inner surface upstream of the guide unit in a flow of air. A position of the side guide surface is located outward of the upstream inner surface. A distance between the upstream guide surface of the service portion and the filter is wider than a distance between the upstream guide surface of the positioning portion and the filter in the mounted state. The case has a water prevention rib protruding from the inner wall surface so as to extend in a direction intersecting a flow of air at a position of the upstream inner surface upstream of the service portion in a flow of air.

Accordingly, the water prevention rib prevents the water from flowing along the side guide surface of the service portion while the water flows along the inner wall surface of the case from the upstream side of the service portion toward the service portion.

The reference numerals attached to the components and the like indicate an example of correspondence between the components and the like and specific components and the like described in embodiments to be described below.

Embodiments of the present disclosure will be described below with reference to the drawings. In the following embodiments, the same reference numerals are assigned to parts that are the same or equivalent to each other to describe the same. In each the drawings, the up-down direction, the front-rear direction, and the left-right direction indicate directions in a state where the air conditioner is mounted in the vehicle.

First Embodiment

As shown in FIG. 1, an air conditioner 10 for a vehicle includes a case 11 and a filter 12. The case 11 has an air passage 11a through which air flows. The arrow F1 in FIG. 1 indicates a flow of air. The filter 12 is mounted inside the case 11 so as to cross the air passage. The filter 12 purifies the air by removing foreign substances in the air. The filter 12 has a filter medium (not shown) for filtering a fluid such as air, and a plate material (not shown) fixed to the end of the filter medium. The filter medium is a filter paper bent in a folded shape. The plate material maintains the bent shape of the filter medium.

The filter 12 is mounted horizontally in the case 11. That is, the filter 12 is installed inside the case 11 so that the extending direction of the filter 12 is along the horizontal direction. The air flow direction at the position of the filter 12 inside the case 11 is from the upper side to the lower side.

The case 11 has an inside air introduction port 13, an outside air introduction port 14, and a switching door 15 at a position upstream of the filter 12 in the air flow. The inside air introduction port 13 is an opening for introducing the inside air, which is air in the cabin, into the air passage 11a. The outside air introduction port 14 is an opening for introducing the outside air, which is air outside the cabin, into the air passage 11a. The switching door 15 selectively opens/closes the inside air introduction port and the outside air introduction port.

A blower and a heat exchanger (not shown) are arranged inside the case 11 at a position downstream of the filter 12 in the air flow. The case 11 has an opening 16 at a position corresponding to the filter 12 in the air flow direction. The opening 16 is for attaching/detaching the filter 12 to/from the case 11. The opening 16 is formed on a rear side wall of the case 11.

Figure 2:
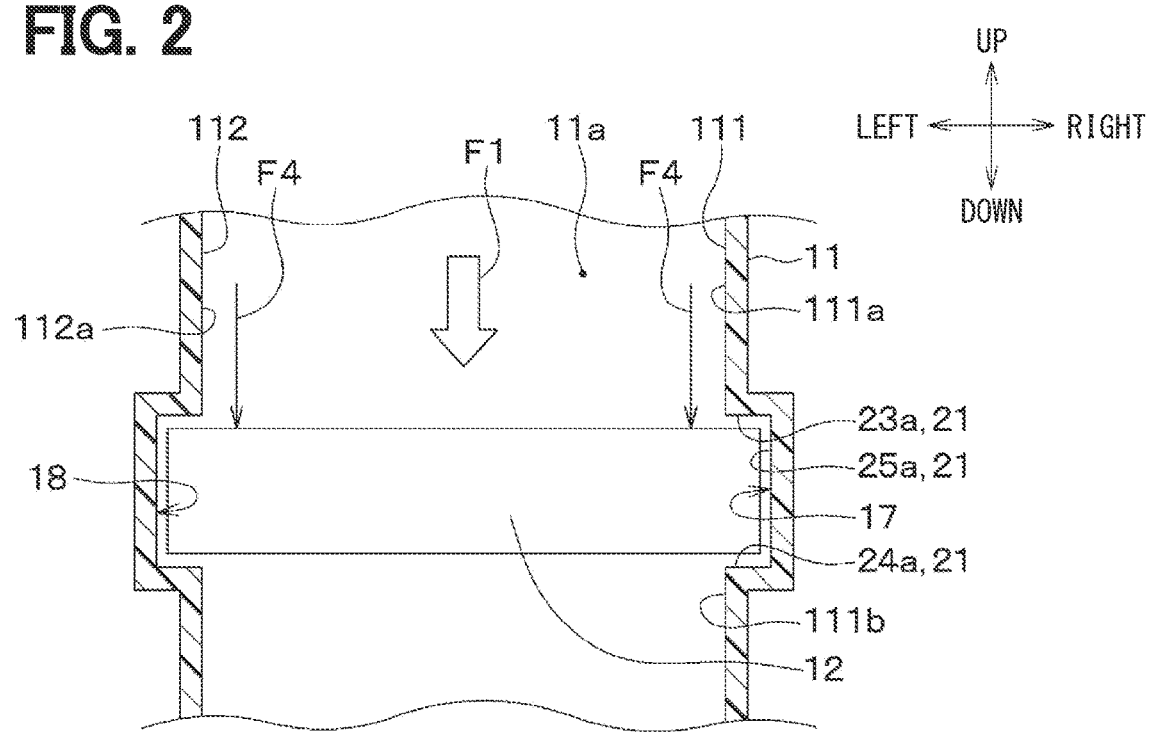
FIG. 2 is a cross-sectional view taken along a line II-II in FIG. 1.
Figure 3:
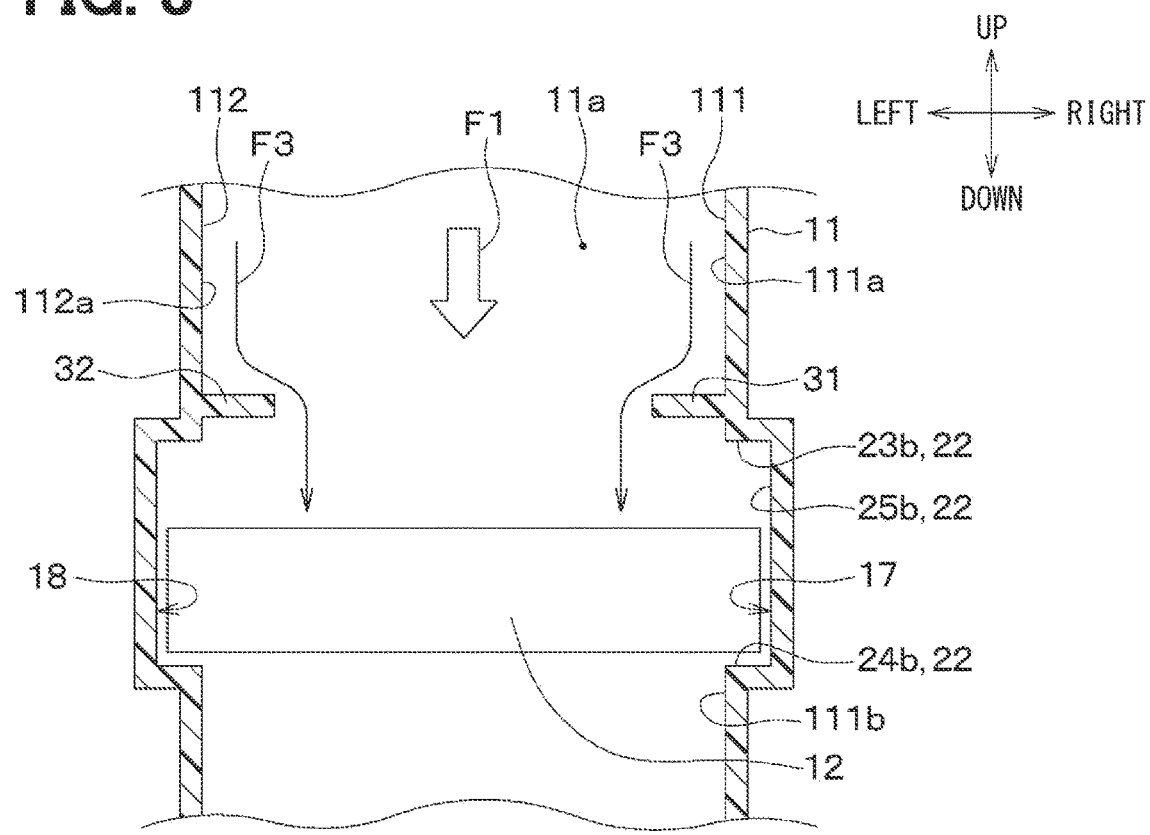
FIG. 3 is a cross-sectional view taken along a line III-III in FIG. 1.

As shown in FIGS. 2 and 3, the case 11 has two guide units 17 and 18. The two guide units 17 and 18 hold the filter 12 in a filter mounted state in which the filter 12 is mounted in the case 11. The filter mounted state is shown in FIGS. 1 to 3. The plate material of the filter 12 is held by the guide units 17 and 18. Further, the two guide units 17 and 18 guide the movement of the filter 12 when the filter 12 is being attached/detached to/from the case 11.

The guide units 17 and 18 are respectively provided on two inner wall surfaces 111 and 112 of the case 11 facing each other. In the present embodiment, the inner wall surfaces 111 and 112 are a right inner wall surface 111 and a left inner wall surface 112 in the left-right direction.

The two guide units 17 and 18 are a right guide unit 17 provided on the right inner wall surface 111 and a left guide unit 18 provided on the left inner wall surface 112. The two guide units 17 and 18 are positioned to face each other in the left-right direction, and have a plane-symmetrical relationship.

FIG. 1 shows the right guide unit 17, and the configuration of the right guide unit 17 will be described. The right guide unit 17 is simply referred to as a guide unit 17. The configuration of the left guide unit 18 is the same as the configuration of the right guide unit 17.

The guide unit 17 includes a positioning portion 21 located away from the opening 16, and a service portion 22 located between the opening 16 and the positioning portion 21. The positioning portion 21 determines the position of the filter 12 in the air flow direction in the filter mounted state. The service portion 22 improves the serviceability of attaching/detaching the filter 12. That is, the service portion 22 improves the workability of attaching/detaching the filter 12 by increasing the degree of freedom in the posture of the filter 12 when attaching/detaching the filter. In the present embodiment, the service portion 22 guides the filter 12 to be tilted with respect to the posture of the filter 12 in the filter mounted state.

As shown in FIGS. 1, 2, and 3, the positioning portion 21 has an upstream guide surface 23a, a downstream guide surface 24a, and a side guide surface 25a. The service portion 22 has an upstream guide surface 23b, a downstream guide surface 24b, and a side guide surface 25b. The upstream guide surface 23a, 23b is in contact with a filter upstream portion, which is a portion of the filter 12 at the upstream side in the air flow in the filter mounted state or when the filter is attached or detached. The downstream guide surface 24a, 24b is in contact with a filter downstream portion, which is a portion of the filter 12 at the downstream side in the air flow in the filter mounted state or when the filter is attached or detached. The side guide surface 25a, 25b is in contact with the side of the filter 12 in the filter mounted state or when the filter is attached or detached. In the present embodiment, the filter upstream portion is the upper portion of the filter 12. The filter downstream portion is the lower portion of the filter 12.

As shown in FIGS. 2 and 3, the guide unit 17 is composed of a recess formed in the inner wall surface 111 on the right side of the case 11. The side guide surface 25a, 25b corresponds to a bottom surface of the recess. The upstream guide surface 23a, 23b and the downstream guide surface 24a, 24b correspond to a side surface of the recess.

In other words, the upstream guide surfaces 23a and 23b, the downstream guide surfaces 24a and 24b, and the side guide surfaces 25a and 25b are composed of a part of the inner wall surface 111. Specifically, the side guide surface 25a, 25b of the inner wall surface 111 is parallel to the side surface of the filter 12. The upstream guide surface 23a, 23b is a stepped surface formed by a step between an upstream inner wall surface 111a of the inner wall surface 111 upstream of the guide unit 17 and the side guide surface 25a, 25b. The downstream guide surface 24a, 24b is a stepped surface formed by a step between a downstream inner wall surface 111b of the inner wall surface 111 downstream of the guide unit 17 and the side guide surface 25a, 25b. The position of the side guide surface 25a, 25b is located outward of the case 11 in a direction orthogonal to the upstream inner wall surface 111a as compared with a position of the upstream inner wall surface 111a.

Further, as shown in FIGS. 2 and 3, the distance between the upstream guide surface 23a and the downstream guide surface 24a in the positioning portion 21 is slightly wider than the thickness of the filter 12. The distance between the upstream guide surface 23b and the downstream guide surface 24b in the service portion 22 is wider than the distance between the upstream guide surface 23a and the downstream guide surface 24a in the positioning portion 21. That is, in the filter mounted state, the distance between the upstream guide surface 23b and the filter 12 in the service portion 22 is wider than the distance between the upstream guide surface 23a and the filter 12 in the positioning portion 21.

As shown in FIG. 1, the downstream guide surface 24a of the positioning portion 21 and the downstream guide surface 24b of the service portion 22 are flush with each other, and extend parallel to the downstream end of the filter 12 (that is, the lower end of the filter 12) in the filter mounted state. Although there is a gap between the filter 12 and the downstream guide surface 24a, 24b in FIG. 1, the filter 12 and the downstream guide surface 24a, 24b are actually in contact with each other.

As shown in FIG. 1, the upstream guide surface 23b of the service portion 22 includes a first inclined surface 26 and a second inclined surface 27. The first inclined surface 26 is inclined so that the distance from the downstream guide surface 24b increases as separating from the opening 16 toward the deep side. The second inclined surface 27 is located on the deep side of the first inclined surface 26. The second inclined surface 27 is inclined so that the distance from the downstream guide surface 24b becomes smaller as separating from the opening 16 to the deep side. As described above, the upstream guide surface 23b of the service portion 22 has a convex shape protruding toward the upstream side in the air flow.

Figure 4:
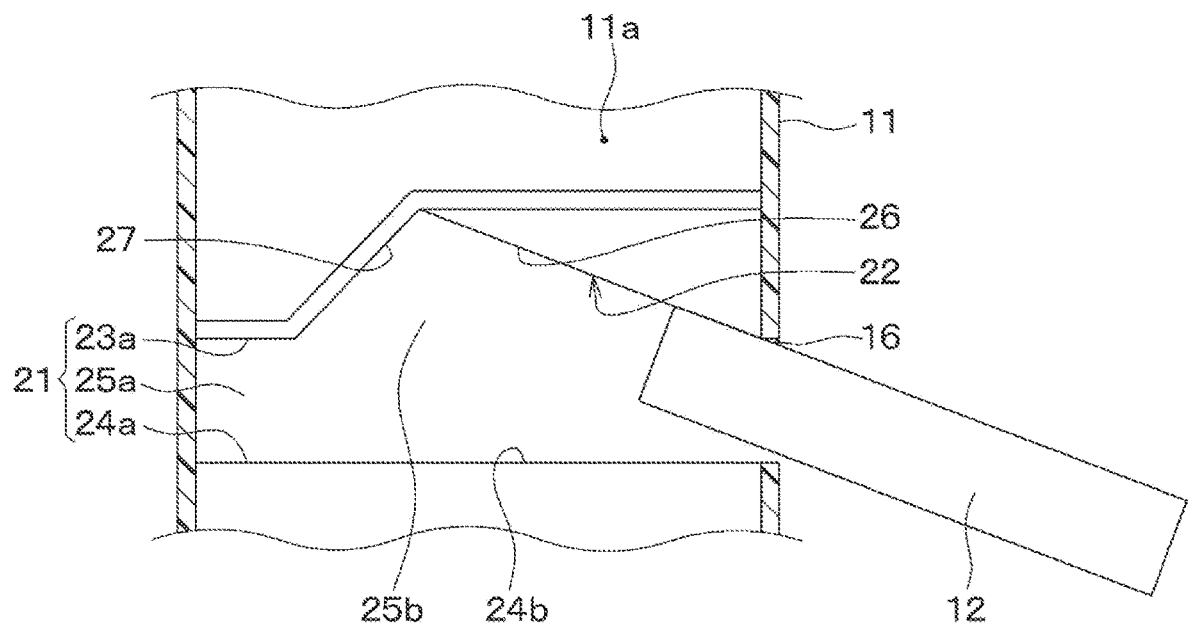
FIG. 4 is a diagram illustrating a filter being attached to/detached from the case in FIG. 1.

The attachment/detachment of the filter 12 will be described with reference to FIGS. 4 and 5. When inserting the filter 12 through the opening 16, as shown in FIG. 4, the filter 12 is inserted along the first inclined surface 26. As a result, the posture of the filter 12 can be tilted with respect to the posture of the filter 12 in the filter mounted state.

Figure 5:
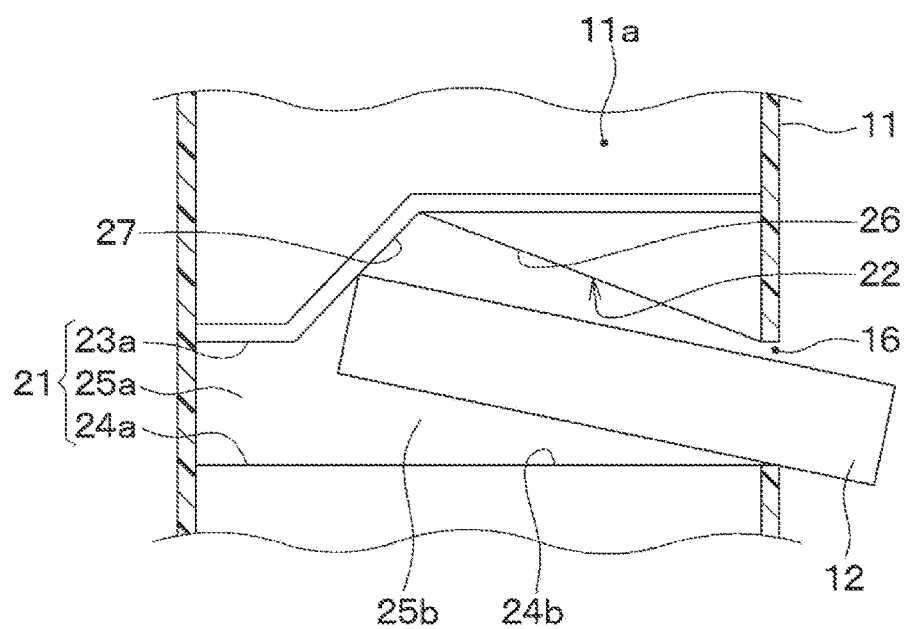
FIG. 5 is a diagram illustrating a filter being attached to/detached from the case in FIG. 1.

Subsequently, as shown in FIG. 5, the filter 12 is moved to the deep side while the tip end of the filter 12 is in contact with the second inclined surface 27. As the tip end of the filter 12 moves along the second inclined surface 27, the posture of the filter 12 approaches the posture of the filter 12 in the filter mounted state.

Further, the filter 12 is moved to the position shown in FIG. 1. When the filter 12 reaches the positioning portion 21, the mounting of the filter 12 is completed. The posture of the filter 12 at this time is a state in which the filter 12 extends substantially horizontally. The filter 12 is taken out in the reverse manner of the above procedure.

In this way, the service portion 22 can tilt the posture of the filter 12 when the filter is attached/detached with respect to the posture of the filter 12 in the filter mounted state. This makes it possible to improve the workability of attaching and detaching the filter 12.

As shown in FIG. 3, the case 11 has two water prevention ribs 31, 32. The two water prevention ribs 31 and 32 are a right water prevention rib 31 provided on the right inner wall surface 111 of the case 11 and a left water prevention rib 32 provided on the left inner wall surface 112 of the case 11.

The two water prevention ribs 31 and 32 are arranged at positions facing each other in the left-right direction. The water prevention rib 31, 32 is arranged on the upstream inner wall surface 111a, 112a at a position upstream of the service portion 22 in the air flow. The upstream inner wall surface 112a is a part of the left inner wall surface 112 upstream of the left guide unit 18. The water prevention rib 31, 32 projects from the upstream inner wall surface 111a, 112a. The position of the tip end of the water prevention rib 31, 32 is higher than the position of the upstream inner wall surface 111a, 112a. In other words, the water prevention rib 31, 32 protrudes into the air passage from the upstream inner wall surface 111a, 112a in the direction perpendicular to the upstream inner wall surface 111a, 112a.

FIG. 1 shows the right water prevention rib 31. Hereinafter, the right water prevention rib 31 will be described, but the same applies to the left water prevention rib 32. Hereinafter, the right water prevention rib 31 is simply referred to as a water prevention rib 31.

As shown in FIG. 1, the water prevention rib 31 is arranged so as to extend in a direction intersecting with the air flow. In other words, the water prevention rib 31 extends from the side away from the opening 16 toward the side closer to the opening 16. Specifically, the water prevention rib 31 continuously extends from the position of one end of the service portion 22 in the front-rear direction to the position of the other end of the service portion 22. That is, the water prevention rib 31 is arranged so as to cover the entire service portion 22 at a position upstream of the service portion 22 in the air flow. The front-rear direction is the same as the extending direction of the filter 12 and the attaching/detaching direction of the filter 12.

More specifically, at the position upstream of the second inclined surface 27 in the air flow, the water prevention rib 31 is arranged adjacent to the second inclined surface 27 and extends parallel to the second inclined surface 27. At the position upstream of the first inclined surface 26 in the air flow, the water prevention rib 31 is arranged away from the first inclined surface 26 and extends parallel to the filter 12. The water prevention rib 31 is not arranged at a position upstream of the positioning portion 21 in the air flow.

Next, the advantages of the embodiment will be described in comparison with Comparative Example 1 shown in FIG. 6. Comparative Example 1 is different from the present embodiment in that the two water prevention ribs 31 and 32 are not provided. Other configurations of Comparative Example 1 are the same as those of the present embodiment. Comparative Example 1 corresponds to a conventional air conditioner for a vehicle.

Water may enter the case 11 through the outside air introduction port 14 at the time of washing, raining, or the like. When water enters the case 11 from the outside of the vehicle, the water flows along the inner wall surface 111, 112 of the case 11, in which the guide units 17 and 18 are provided, toward the filter 12 from the upstream side in the air flow.

In Comparative Example 1, a large gap is formed between the upstream guide surface 23b of the service portion 22 and the filter 12 in the filter mounted state. This large gap is a space adjacent to the side guide surface 25b of the service portion 22 not to face the filter 12.

Figure 6:
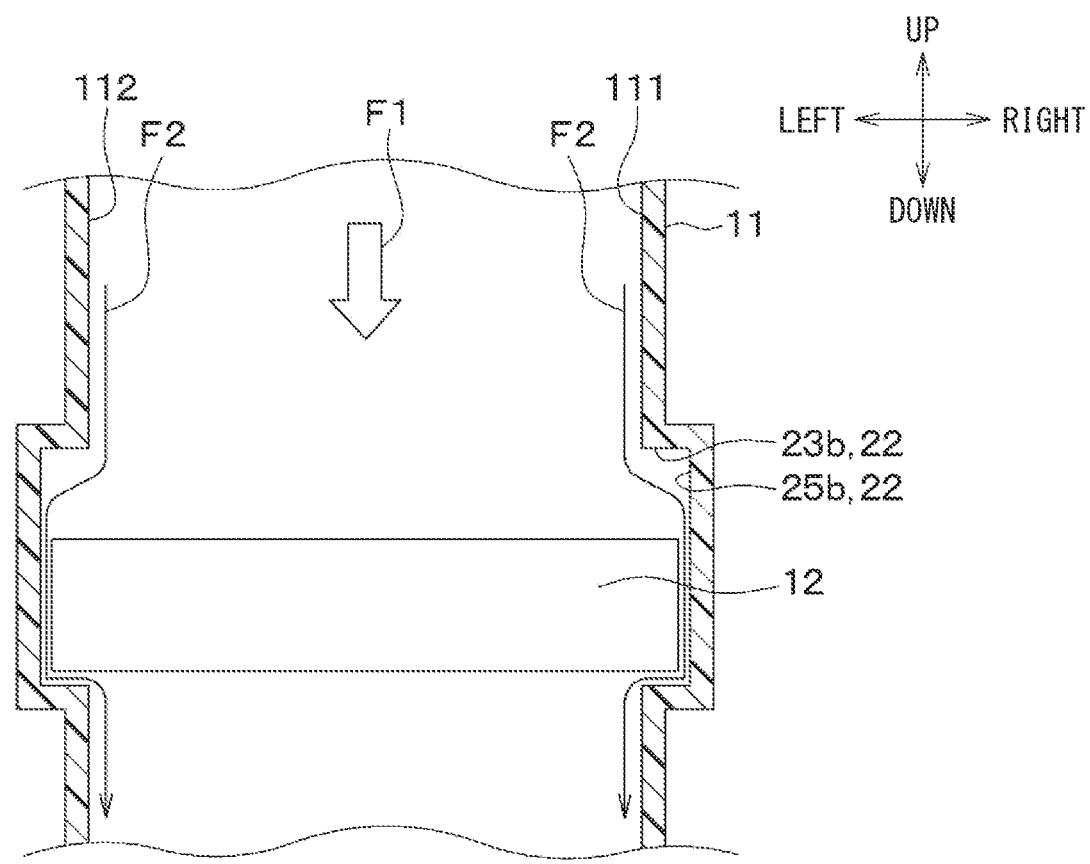
FIG. 6 is a cross-sectional view of an air conditioner of Comparative Example 1, corresponding to FIG. 3.

Therefore, as shown by the arrow F2 in FIG. 6, water flows from the upstream side of the service portion 22 along the side guide surface 25b of the service portion 22, and flows in a gap between the side guide surface 25b and the filter 12. As described above, the present inventor has found that the water flowing along the inner wall surface 111, 112 does not pass through the filter 12 and flows to the downstream side of the filter 12.

The water from the outside of the vehicle contains foreign matter such as dust. If the water flows to the downstream side of the filter 12 in the case 11 without passing through the filter 12, the drain port will be clogged due to the accumulation of foreign matter and an offensive odor will be generated. If the foreign matter adheres to a heat exchanger, the heat exchanger has corrosion.

According to the present embodiment, the case 11 has the two water prevention ribs 31 and 32. Therefore, water flowing along the inner wall surface 111, 112 of the case 11 from the upstream side toward the service portion 22 can be restricted from flowing along the side guide surface 25b of the service portion 22.

In the present embodiment, as shown by the arrow F3 in FIG. 3, the water flowing along the inner wall surface 111, 112 of the case 11 flows into the filter 12, due to the water prevention rib 31, 32, in the state separated from the inner wall surface 111, 112. As the water passes through the filter 12, foreign substances contained in the water can be removed by the filter 12. As a result, it is possible to suppress an offensive odor due to the accumulation of foreign matter, clogging of the drain port, and corrosion of the heat exchanger due to the foreign matter adhering to the heat exchanger.

As shown in FIG. 2, in the positioning portion 21, the gap between the upstream guide surface 23a and the filter 12 is small in the filter mounted state. Therefore, the water flowing along the inner wall surface 111, 112 of the case 11 from the upstream side of the positioning portion 21 toward the filter 12 passes through the filter 12 as shown by the arrow F4 in FIG. 2.

In the present embodiment, the water prevention rib 31 is arranged so as to extend parallel to the filter 12 at a position upstream of the first inclined surface 26 in the air flow. However, the water prevention rib 31 may be arranged so as to be adjacent to the first inclined surface 26 and extend parallel to the first inclined surface 26.

Further, in the present embodiment, the water prevention rib 31 is arranged adjacent to the second inclined surface 27 at the position upstream of the second inclined surface 27 in the air flow. However, the water prevention rib 31 may be arranged away from the second inclined surface 27 on the upstream side in the air flow. Further, the water prevention rib 31 may be arranged so as to extend in a straight line at a position separated from each of the first inclined surface 26 and the second inclined surface 27 on the upstream side in the air flow. The water prevention rib 31 may be arranged away from the service portion 22 on the upstream side in the air flow. In this case, the height of the water prevention rib 31 is set such that the water does not flow along the side guide surface 25b of the service portion 22 and passes through the filter 12 when water flows from the upstream side of the service portion 22 along the inner wall surface 111, 112. That is, the water prevention rib 31 is set higher as the distance from the service portion 22 to the upstream side increases.

Second Embodiment

Figure 7:
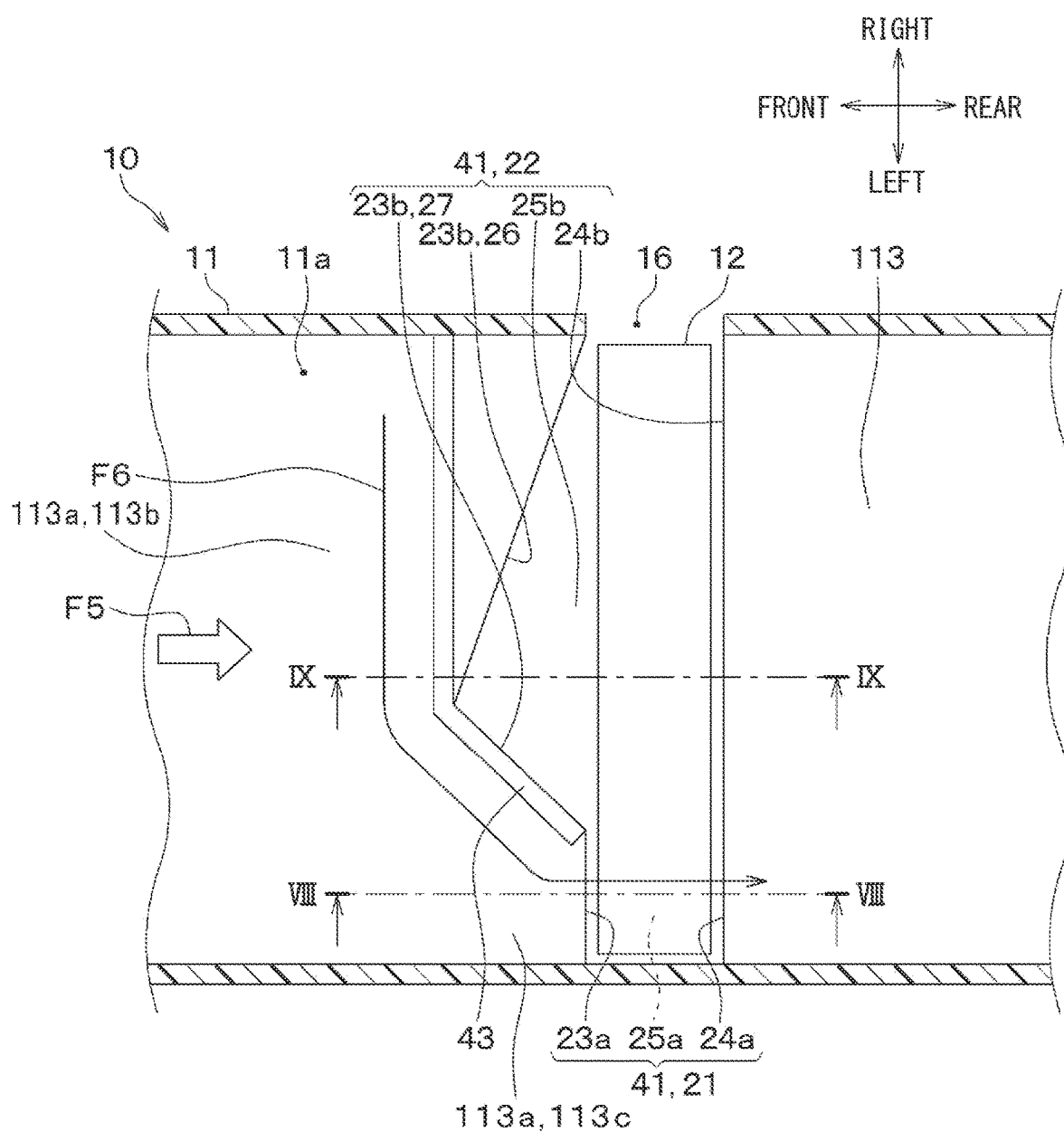
FIG. 7 is a cross-sectional view illustrating an air conditioner for a vehicle according to a second embodiment.
Figure 8:
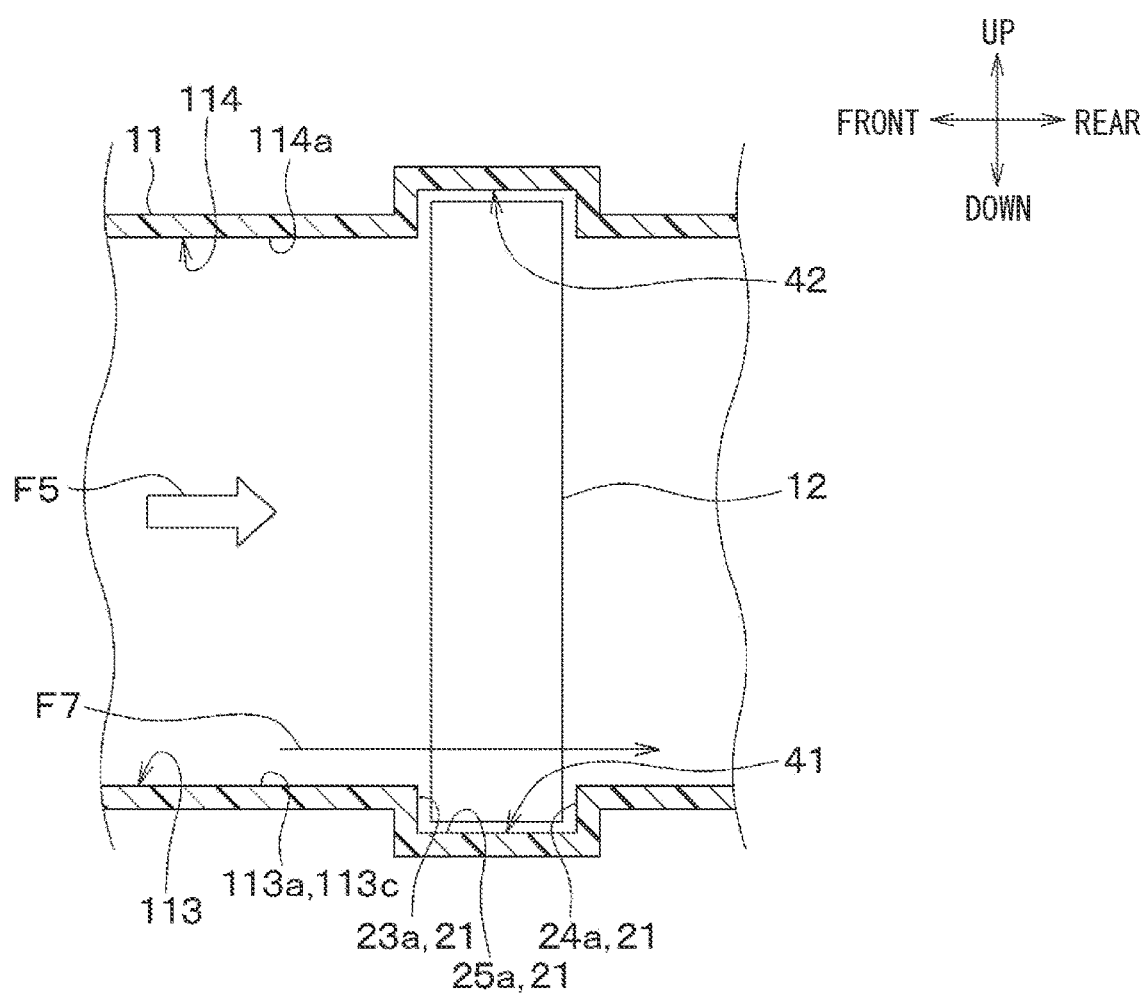
FIG. 8 is a cross-sectional view taken along a line VIII-VIII in FIG. 7.
Figure 9:
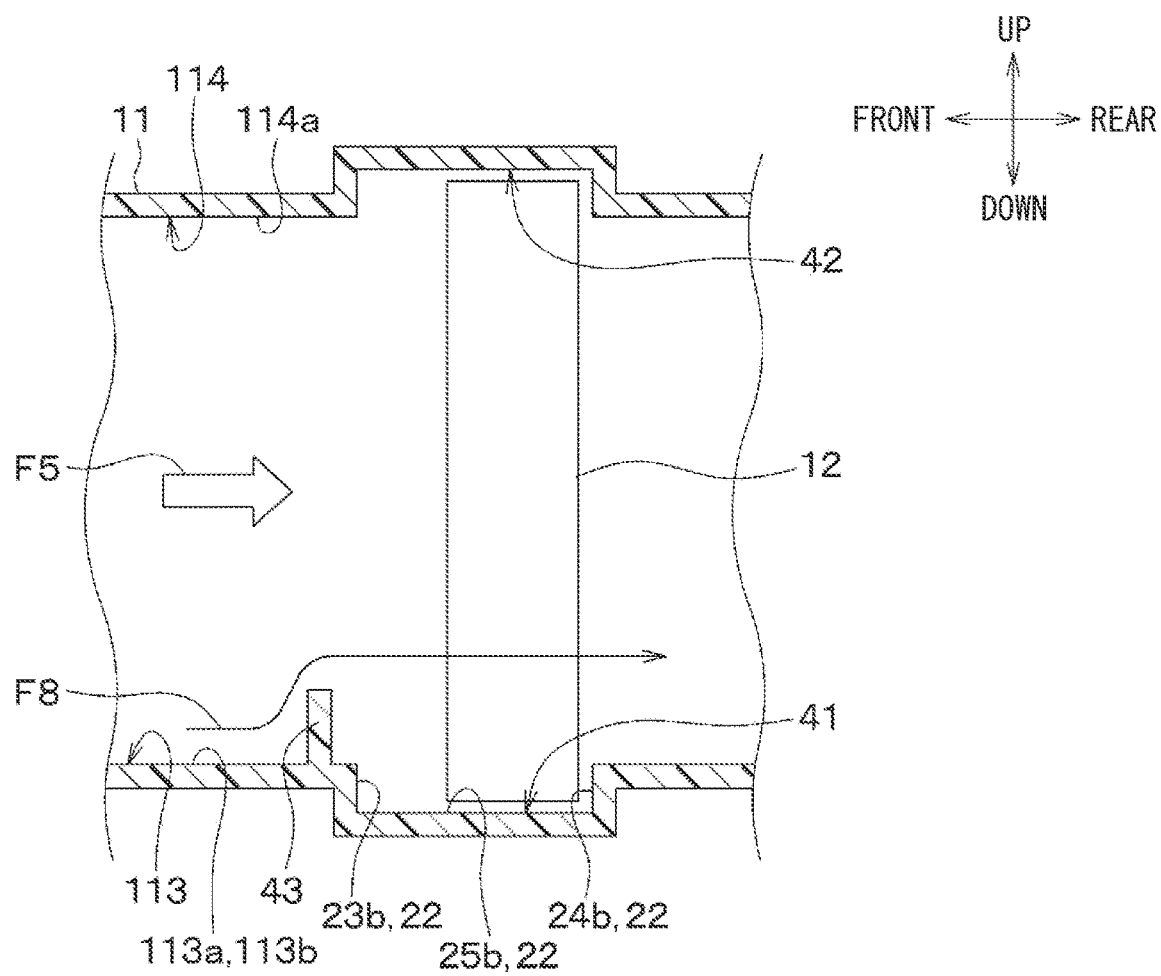
FIG. 9 is a cross-sectional view taken along a line IX-IX in FIG. 7.

As shown in FIGS. 7 to 9, in the present embodiment, the filter 12 is mounted vertically in the case 11. That is, the filter 12 is installed inside the case 11 so that the extending direction of the filter 12 is along the vertical direction.

The case 11 has an upper wall, a lower wall, a left wall, and a right wall. The air flow direction in the air passage 11a at the installation position of the filter 12 is from the front side of the vehicle to the rear side of the vehicle as shown by the arrow F5 in FIGS. 7 to 9. That is, the air flow direction in the air passage 11a at the installation position of the filter 12 is along the horizontal direction.

As shown in FIG. 7, the opening 16 is formed on the right wall of the case 11. The attachment/detachment direction of the filter 12 is the left-right direction.

As shown in FIGS. 8 and 9, the inner wall surface of the case 11 includes a case bottom surface 113 and a case upper surface 114. The case bottom surface 113 is an inner wall surface of the case 11 located on the lower side. The case upper surface 114 is an inner wall surface of the case 11 located on the upper side. The case bottom surface 113 and the case upper surface 114 are two inner wall surfaces facing each other.

The case 11 has two guide units 41 and 42. The two guide units 41 and 42 correspond to the two guide units 17 and 18 of the first embodiment. The two guide units 41 and 42 include a lower guide unit 41 provided on the case bottom surface 113 and an upper guide unit 42 provided on the case upper surface 114. The two guide units 41 and 42 are positioned so as to face each other in the vertical direction and have a plane-symmetrical relationship. The configurations of the two guide units 41 and 42 are the same as the configurations of the two guide units 17 and 18 of the first embodiment.

In the present embodiment, the position of the side guide surface 25a, 25b of the lower guide unit 41 is located outward of the case 11 in a direction orthogonal to the upstream inner wall surface 113a, compared with the position of the upstream inner wall surface 113a of the case bottom surface 113 upstream of the lower guide unit 41 in the air flow. Similarly, the position of the side guide surface 25a, 25b of the upper guide unit 42 is located outward of the case 11 in a direction orthogonal to the upstream inner wall surface 114a, compared with the position of the upstream inner wall surface 114a of the case upper surface 114 upstream of the upper guide unit 42 in the air flow.

As shown in FIGS. 7 and 9, in the present embodiment, the case 11 has a lower water prevention rib 43 as a water prevention rib. The lower water prevention rib 43 corresponds to the water prevention rib 31 of the first embodiment. Hereinafter, the lower water prevention rib 43 is simply referred to as a water prevention rib 43.

In the present embodiment, the air flow direction in the air passage 11a at the installation position of the filter 12 is along the horizontal direction. Therefore, when water enters the case 11 from the outside of the vehicle, the water often flows along the case bottom surface 113 rather than flowing along the case upper surface 114.

Therefore, in the present embodiment, the water prevention rib 43 is provided on the case bottom surface 113. The water prevention rib is not provided on the case upper surface 114. The water prevention rib 43 projects upward from the case bottom surface 113. The arrangement of the water prevention rib 43 is the same as that of the water prevention rib 31 of the first embodiment. Further, in the present embodiment, a rib upstream region 113b of the case bottom surface 113 upstream of the water prevention rib 43 in the air flow and a positioning upstream region 113c of the case bottom surface 113 upstream of the positioning portion 21 in the air flow are at the same position in the vertical direction.

According to the present embodiment, the water prevention rib 43 prevents the water flowing from the upstream side toward the service portion 22 along the case bottom surface 113 from flowing along the side guide surface 25b of the service portion 22. In the present embodiment, as shown by the arrow F6 in FIG. 7, the water flows along the case bottom surface 113 from the upstream side toward the service portion 22. That is, after reaching the water prevention rib 43, the water flows along the water prevention rib 43 from the service portion 22 toward the positioning portion 21 along the case bottom surface 113. Then, the water passes through the filter 12 adjacent to the positioning portion 21. At this time, as shown in FIG. 8, in the positioning portion 21, the gap between the upstream guide surface 23a and the filter 12 is small in the filter mounted state. Therefore, the water flowing on the case bottom surface 113 toward the positioning portion 21 passes through the filter 12 as shown by the arrow F7 in FIG. 8.

According to the present embodiment, the water prevention rib 43 is provided on the case bottom surface 113 at a position upstream of the service portion 22 of the lower guide unit 41 in the air flow, and is not provided in the positioning upstream region 113c. Further, the water prevention rib 43 is provided so as to guide water from the upstream region of the case bottom surface 113 upstream of the service portion 22 in the air flow toward the positioning upstream region 113c. As a result, the water that has reached the water prevention rib 43 along the case bottom surface 113 can flow into the filter 12 from the positioning upstream region 113c of the case bottom surface 113.

Further, also in the present embodiment, as shown by the arrow F8 in FIG. 9, the water flowing along the case bottom surface 113 may flow into the filter 12 by getting over the water prevention rib 43 away from the case bottom surface 113.

Further, according to the present embodiment, the water prevention rib 43 is provided only on the case bottom surface 113, not on the case upper surface 114. Therefore, the ventilation resistance due to the water prevention ribs can be reduced as compared with the case where the water prevention ribs are provided on both of the two inner wall surfaces facing each other.

In this embodiment, the water prevention rib is not provided on the case upper surface 114. However, due to the wind flowing through the air passage 11a, water may flow along the case upper surface 114. Therefore, in addition to the case bottom surface 113, a water prevention rib may be provided on the case upper surface 114.

Further, also in the present embodiment, the arrangement of the water prevention rib 43 can be changed as in the case of the water prevention rib 31 of the first embodiment. However, in the present embodiment, since water mainly flows along the inner wall surface of the case, it is preferable that the water prevention rib 43 is arranged so as to guide the water to the filter 12 located adjacent to the positioning portion 21. For example, the water prevention rib 43 may be arranged so that the distance between the water prevention rib 43 and the filter 12 becomes wider as approaching the opening 16 in the direction parallel to the filter 12 in the filter mounted state.

Third Embodiment

Figure 10:
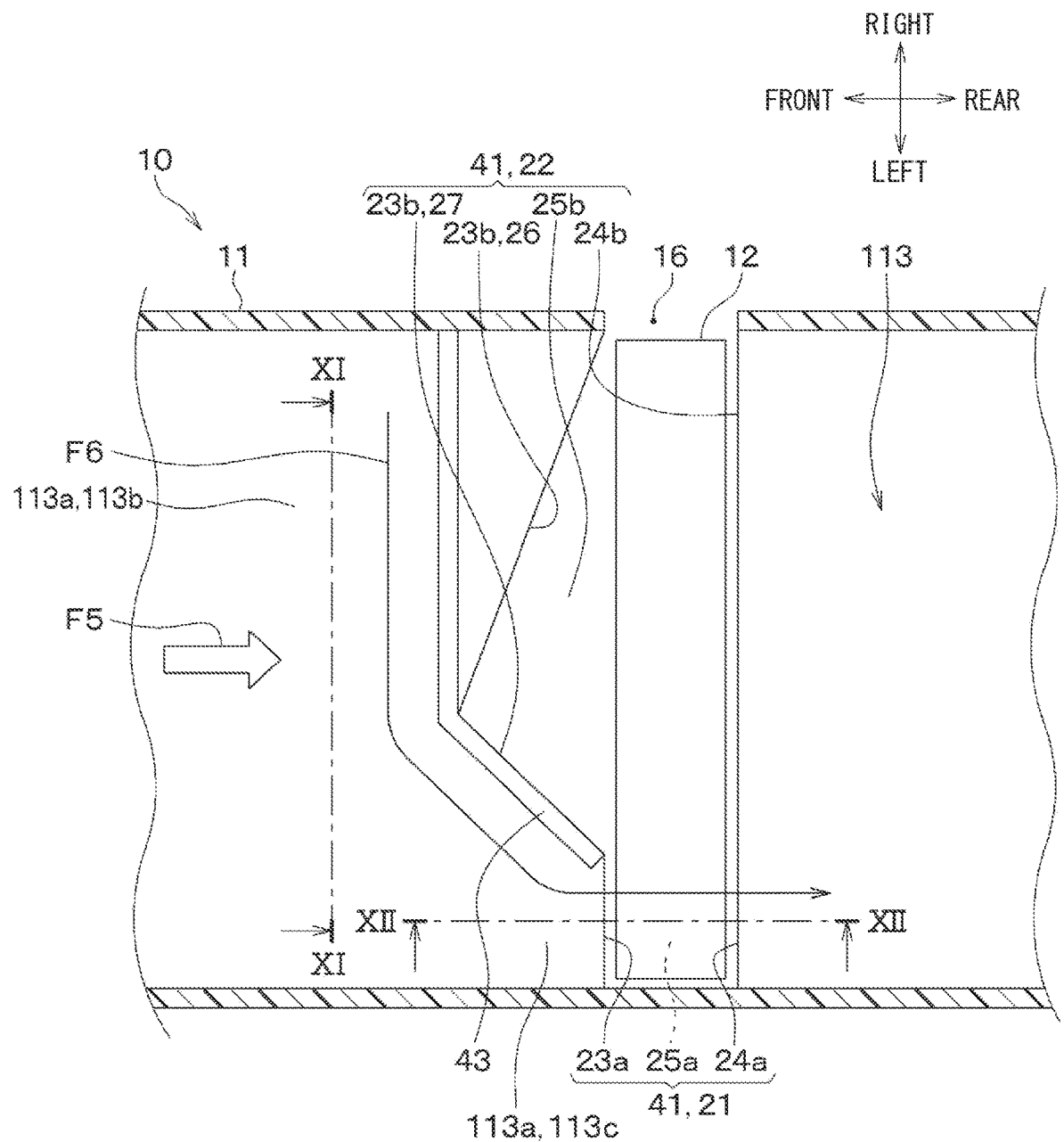
FIG. 10 is a cross-sectional view illustrating an air conditioner for a vehicle according to a third embodiment.
Figure 11:
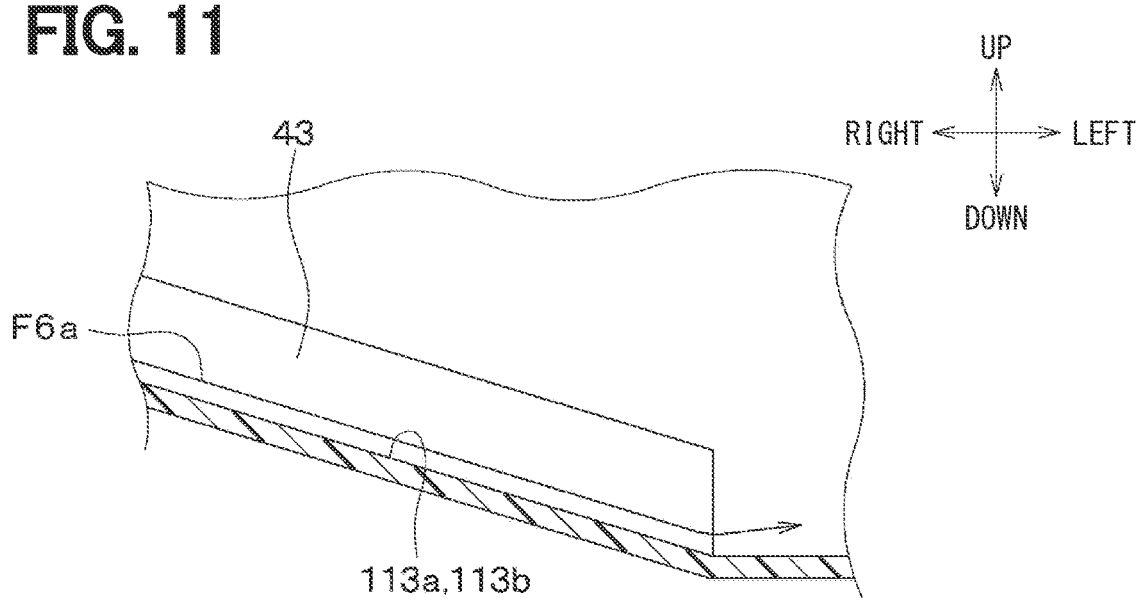
FIG. 11 is a cross-sectional view taken along a line XI-XI in FIG. 10.

The present embodiment is modified from the second embodiment in that the case bottom surface 113 is inclined. Specifically, as shown in FIGS. 10 and 11, the rib upstream region 113b of the case bottom surface 113 becomes lower as extending from the opening 16 toward the positioning portion 21. The rib upstream region 113b is inclined over the entire range from the opening 16 to the positioning portion 21. Therefore, the entire range of the rib upstream region 113b is located higher than the positioning upstream region 113c. The rib upstream region 113b includes an area adjacent to the water prevention rib 43.

As a result, as shown by the arrow F6a in FIG. 11, the water flowing along the case bottom surface 113 toward the service portion 22 is guided from the rib upstream region 113b of the case bottom surface 113 to the positioning upstream region 113c.

Figure 12:
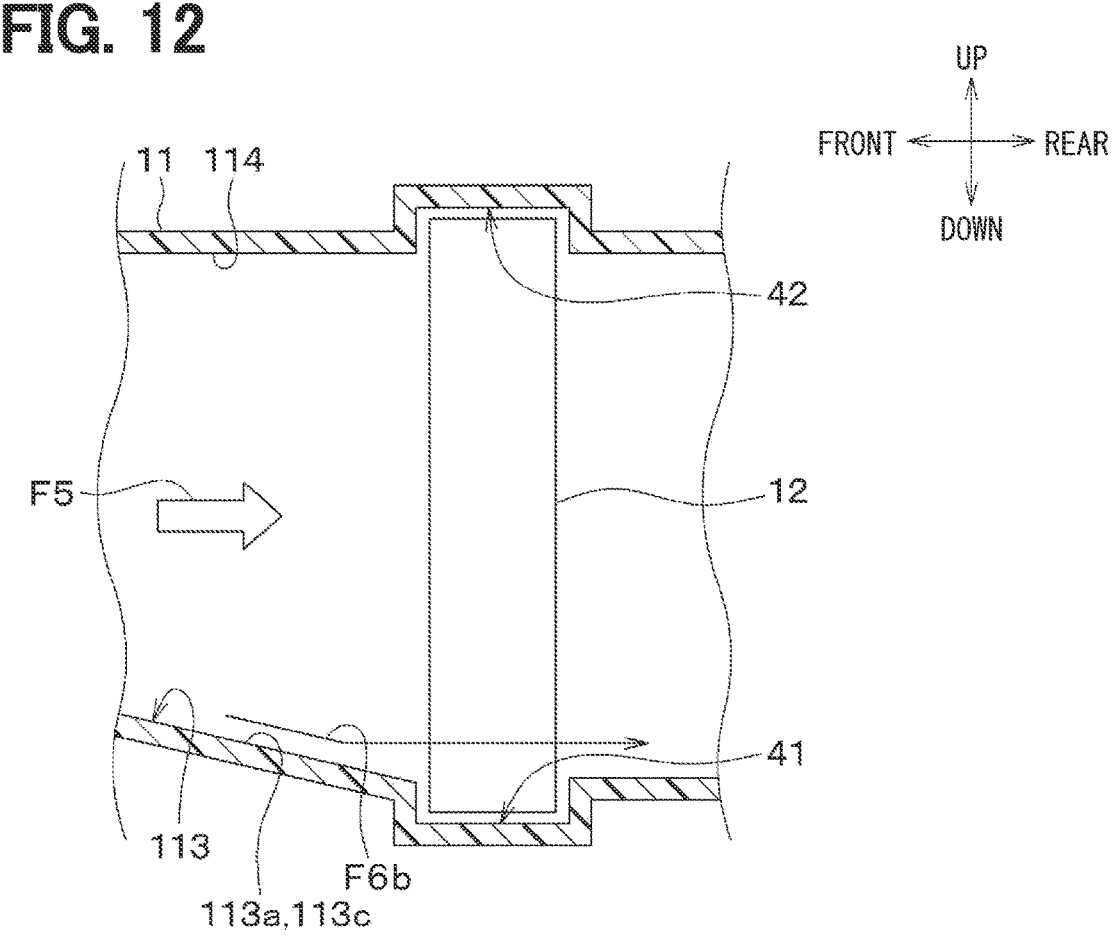
FIG. 12 is a cross-sectional view taken along a line XII-XII in FIG. 10.

Further, as shown in FIGS. 10 and 12, the positioning upstream region 113c of the case bottom surface 113 is inclined so as to become lower toward the downstream side in the air flow. That is, the positioning upstream region 113c is inclined so as to be lowered from the front side to the rear side of the vehicle. Therefore, the upstream portion of the positioning upstream region 113c in the air flow is located at a higher position than the downstream portion of the positioning upstream region 113c in the air flow. The upstream portion is located on the upstream side of the downstream portion in the air flow. Further, the positioning upstream region 113c includes a portion adjacent to the positioning portion 21.

As a result, the water that has reached the positioning upstream region 113c easily flows toward the filter 12, as shown by the arrow F6b in FIG. 12. As a result, it is possible to promote the water flowing along the case bottom surface 113 to pass through the filter 12.

Further, the other configurations of the present embodiment are the same as those of the second embodiment. Thus, similar advantages to those of the second embodiment can be obtained.

In this embodiment, both the rib upstream region 113b and the positioning upstream region 113c are inclined. However, only one of the rib upstream region 113b and the positioning upstream region 113c may be inclined. Even in this case, the water flowing along the case bottom surface 113 can be facilitated to pass through the filter 12 as compared with the case where both the rib upstream region 113b and the positioning upstream region 113c are horizontal surfaces.

Fourth Embodiment

Figure 13:
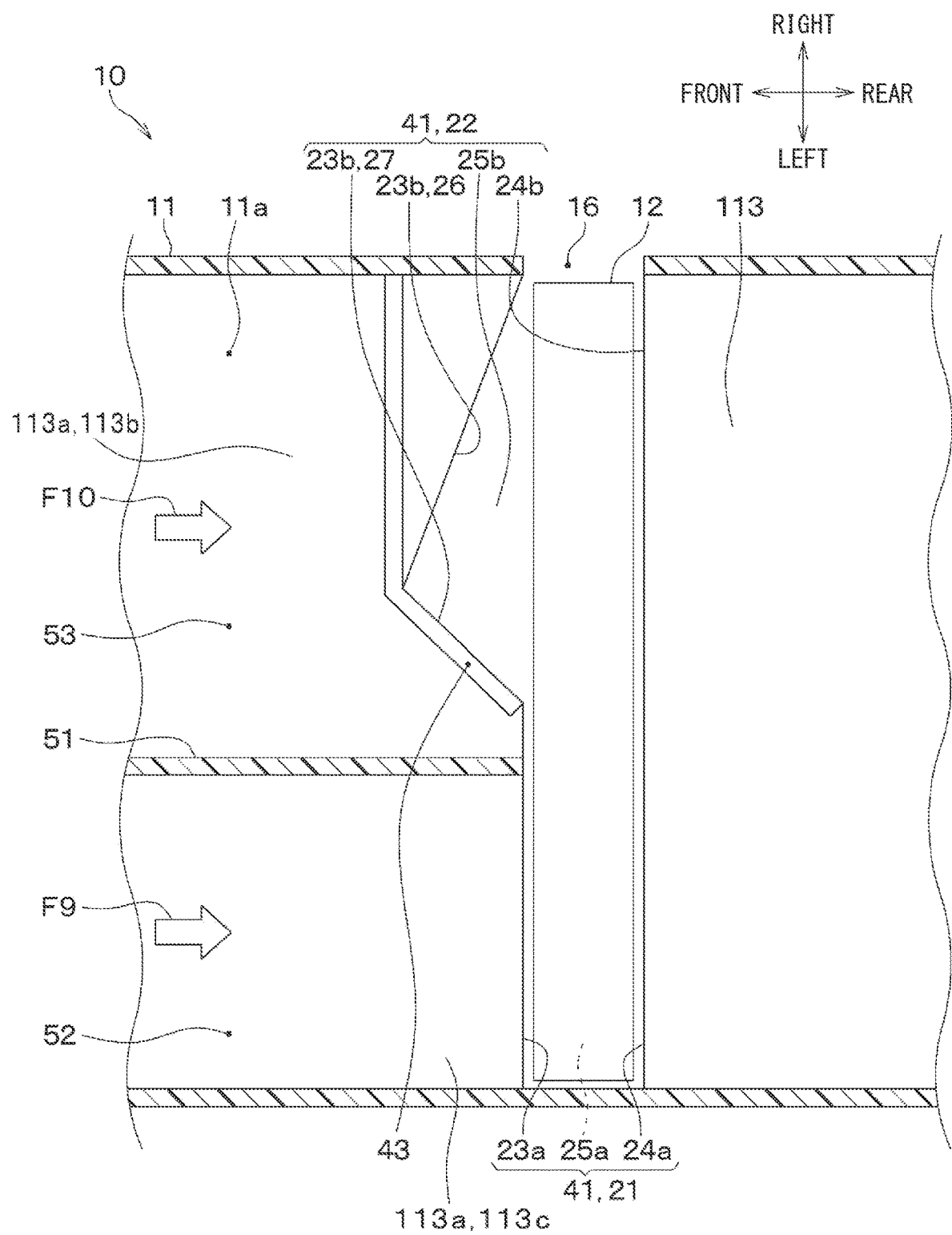
FIG. 13 is a cross-sectional view illustrating an air conditioner for a vehicle according to a fourth embodiment.

As shown in FIG. 13, in the present embodiment, an inside/outside air two-layer partition 51 is added to the case 11 with respect to the second embodiment. The inside/outside air two-layer partition 51 partitions the air passage 11a into an inside air passage 52 through which the inside air flows as shown by the arrow F9 and an outside air passage 53 through which the outside air flows as shown by the arrow F10. The inside/outside air two-layer partition 51 is arranged upstream of the filter 12 in the air flow.

The inside air passage 52 is located on the left side of the vehicle in the air passage 11a. The outside air passage 53 is located on the right side of the vehicle in the air passage 11a. The opening 16 is formed on the wall on the right side of the case 11. That is, the opening 16 is formed on the wall of the case 11 that defines the outside air passage 53.

The two guide units 41 and 42 are provided so as to cross both the outside air passage 53 and the inside air passage 52 from the opening 16. Note that, in FIG. 13, only the lower guide unit 41 of the two guide units 41 and 42 is shown. The positioning portion 21 is provided over the entire area of the inside air passage 52 and a part of the outside air passage 53 adjacent to the inside/outside air two-layer partition 51. The service portion 22 is provided in a part of the outside air passage 53 adjacent to the opening 16 with respect to the inside/outside air two-layer partition 51.

As described above, in the present embodiment, the service portion 22 is provided only in the outside air passage 53, not in the inside air passage 52. Therefore, the water prevention rib 43 is provided only in the outside air passage 53, not in the inside air passage 52. Other configurations of this embodiment are the same as those of the second embodiment. According to the present embodiment, the same effect as that of the second embodiment can be obtained.

Fifth Embodiment

Figure 14:
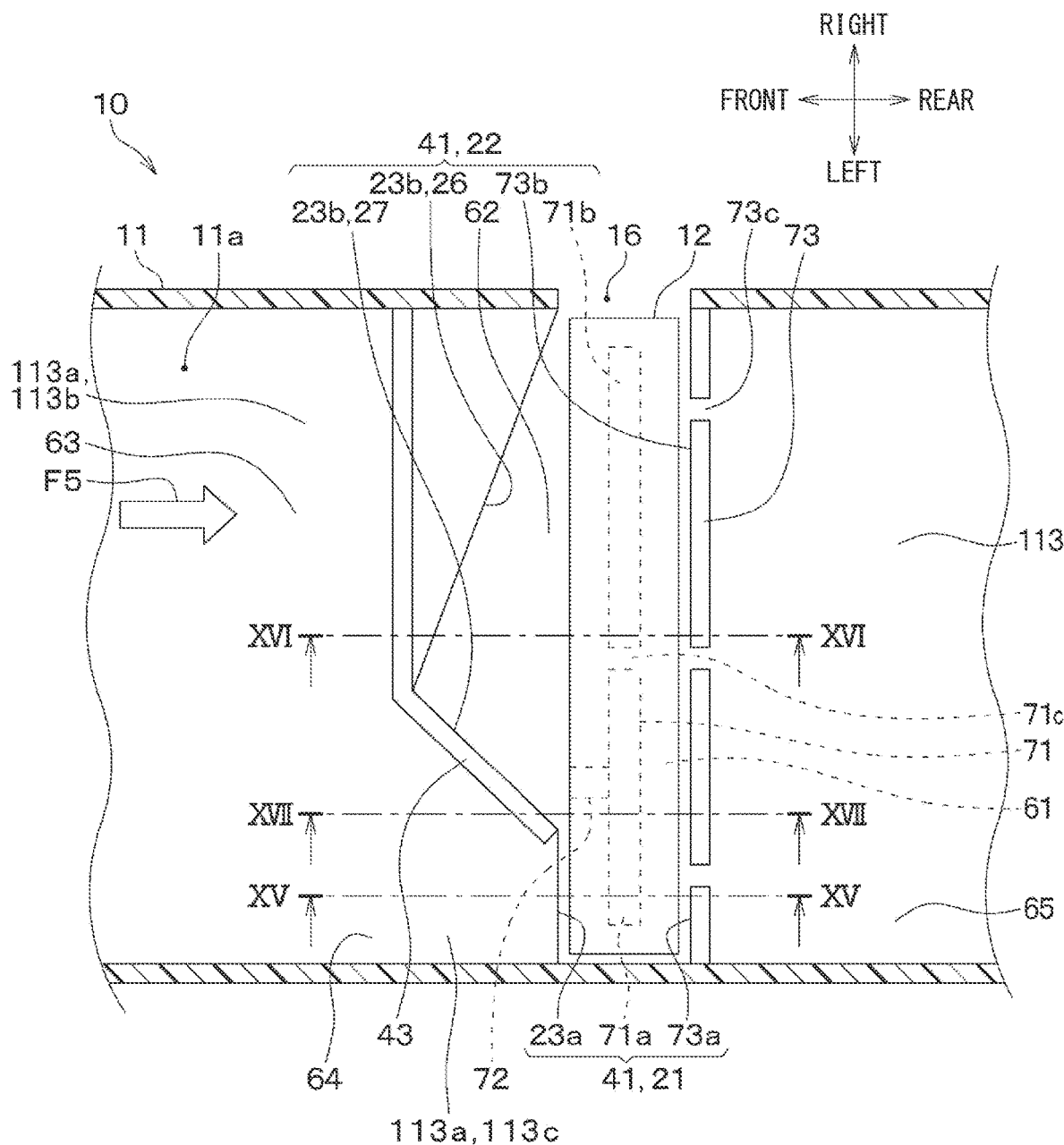
FIG. 14 is a cross-sectional view illustrating an air conditioner for a vehicle according to a fifth embodiment.

As shown in FIG. 14, in the present embodiment, the draining rib 71 and the catch prevention rib 72 are added to the second embodiment.

The draining rib 71 is provided in a filter lower region 61 of the case bottom surface 113. The filter lower region 61 is a region of the case bottom surface 113 located below the filter 12 in the filter mounted state. The draining rib 71 is a protruding portion protruding from the filter lower region 61. The draining rib 71 linearly extends from the opening 16 toward the opposite side of the opening 16 in the filter lower region 61. The width dimension of the draining rib 71 in the thickness direction of the filter 12 is smaller than the thickness dimension of the filter 12.

The case bottom surface 113 has a service portion region 62, a service upstream region 63, a positioning upstream region 64, a filter downstream region 65 in addition to the filter lower region 61. The service portion region 62 is a region of the case bottom surface 113 that constitutes the service portion 22 upstream of the filter 12 in the air flow in the filter mounted state. The service upstream region 63 is a region of the case bottom surface 113 adjacent to the service portion region 62 on the upstream side in the air flow. The positioning upstream region 64 upstream of the positioning portion is a region of the case bottom surface 113 adjacent to the positioning portion 21 at the upstream side in the air flow. The filter downstream region 65 is a region of the case bottom surface 113 adjacent to the filter 12 on the downstream side in the air flow.

Figure 15:
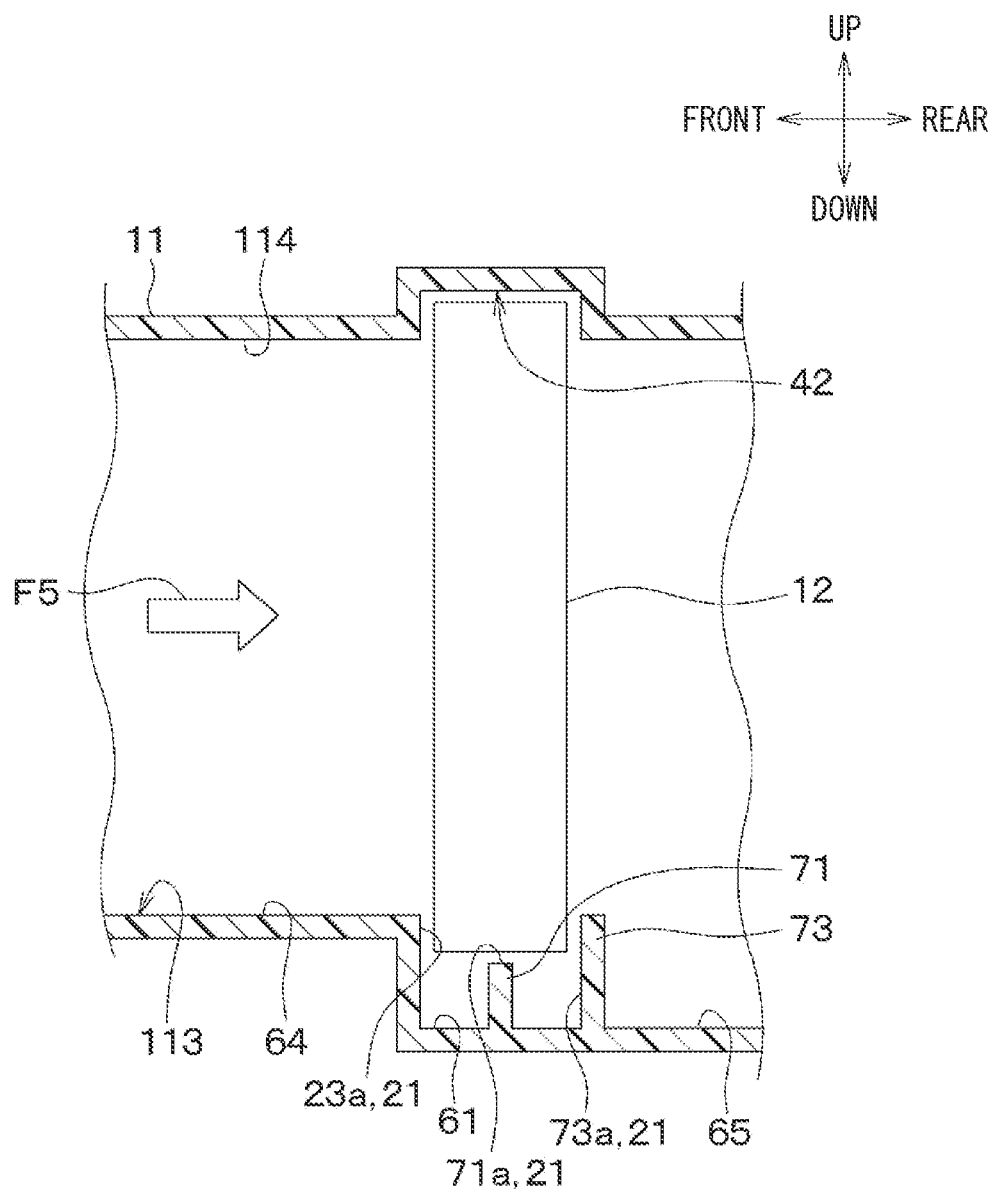
FIG. 15 is a cross-sectional view taken along a line XV-XV in FIG. 14.
Figure 16:
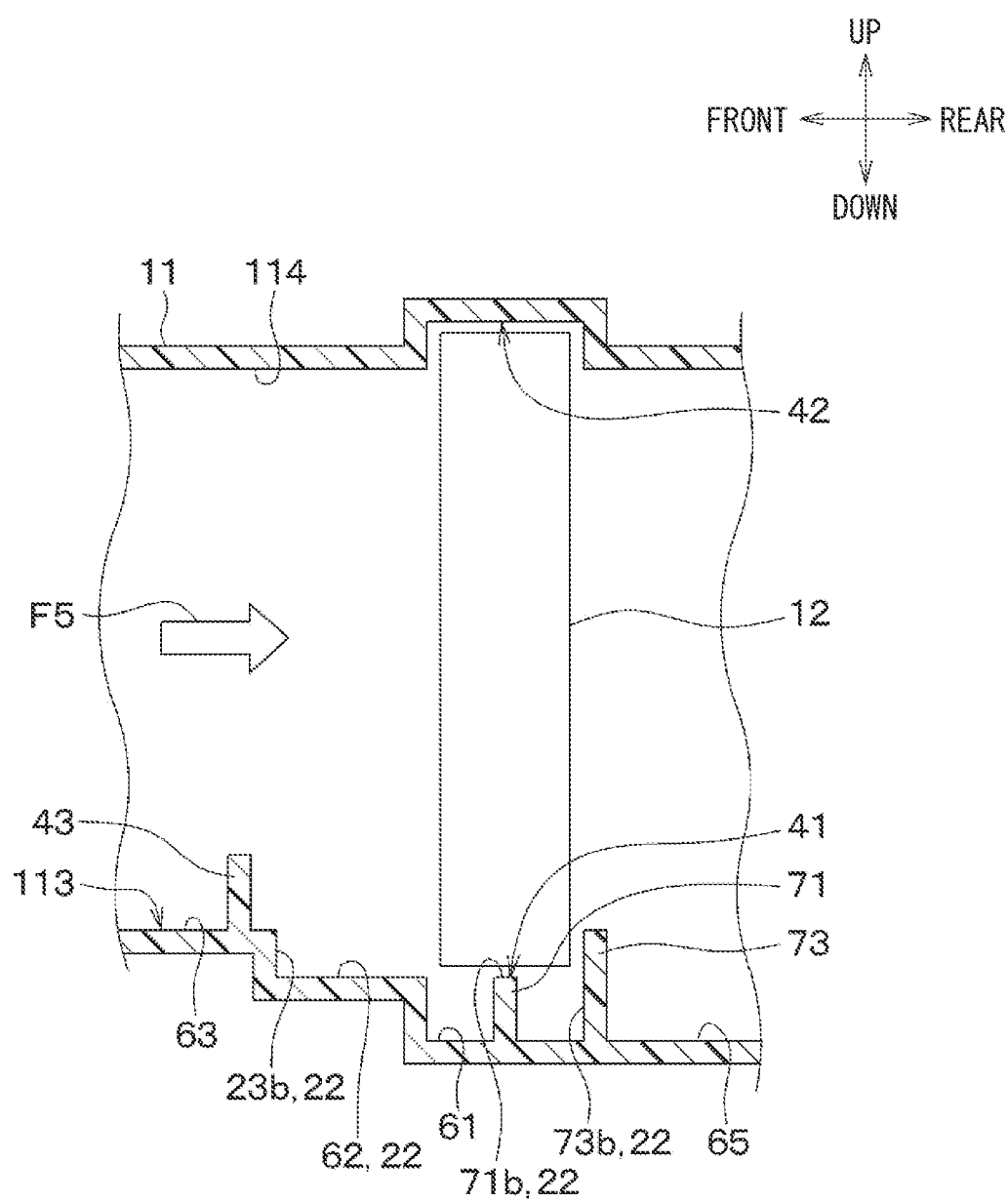
FIG. 16 is a cross-sectional view taken along a line XVI-XVI in FIG. 14.

As shown in FIGS. 15 and 16, the filter lower region 61 is located lower than the service portion region 62, the service upstream region 63, and the positioning upstream region 64 in the vertical direction. The service portion region 62 is located at a position lower than the service upstream region 63 and the positioning upstream region 64 in the vertical direction. Further, the filter downstream region 65 is at the same position in the vertical direction as the filter lower region 61.

As shown in FIG. 16, the upper end surface of the draining rib 71 is at the same position in the vertical direction as the service portion region 62.

As shown in FIG. 14, the catch prevention rib 72 is provided in the filter lower region 61 of the case bottom surface 113. The catch prevention rib 72 is a protruding portion protruding from the filter lower region 61. The catch prevention rib 72 is located between the draining rib 71 and the service portion region 62. The catch prevention rib 72 is connected to both the draining rib 71 and the service portion region 62.

Figure 17:
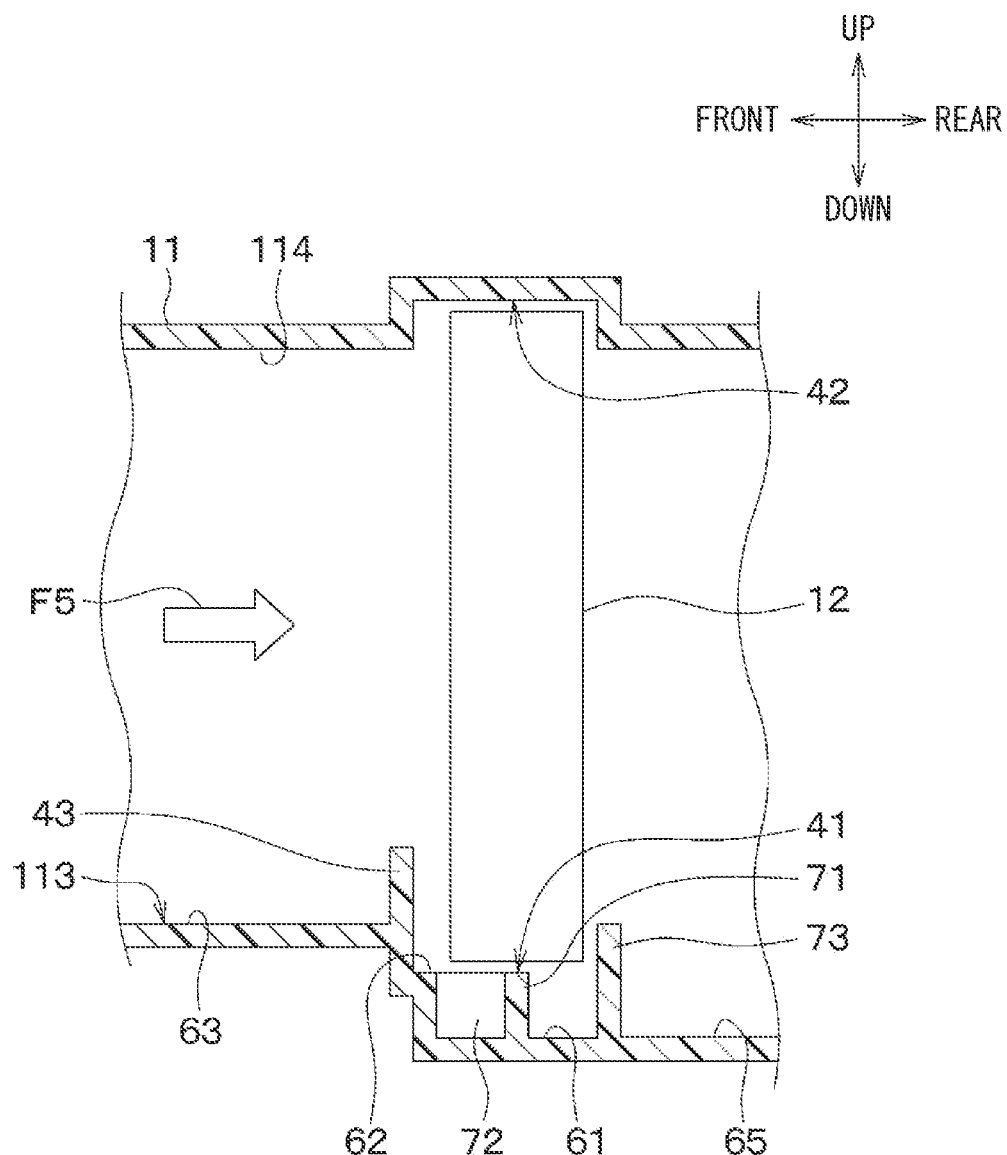
FIG. 17 is a cross-sectional view taken along a line XVII-XVII in FIG. 14.

As shown in FIG. 17, the upper end surface of the catch prevention rib 72 is at the same position in the vertical direction with respect to each of the service portion region 62 and the upper end surface of the draining rib 71. That is, the upper end surface of the catch prevention rib 72 is flush with each of the service portion region 62 and the upper end surface of the draining rib 71.

Further, the case 11 has a guide rib 73 constituting the downstream guide surface 24a, 24b. The guide rib 73 is provided in the filter downstream region 65. The guide rib 73 is a protruding portion protruding from the filter downstream region 65. The guide rib 73 extends along the filter 12 from the opening 16 in the direction along the filter 12 toward the opposite side of the opening 16.

In the present embodiment, the side guide surface of the positioning portion 21 is composed of the upper end surface of the draining rib 71. Specifically, the side guide surface of the positioning portion 21 is a deep side portion 71a of the upper end surface of the draining rib 71 located on the opposite side of the opening 16. The side guide surface of the service portion 22 is composed of the service portion region 62 and the upper end surface 71b of the draining rib 71 located between the opening 16 and the deep side portion 71a. That is, the service portion region 62 constitutes a part of the side guide surface of the service portion 22. The downstream guide surface of the positioning portion 21 is composed of a deep side portion 73a of the guide rib 73, which is an upstream surface in the air flow. The downstream guide surface of the service portion 22 is composed of an upstream surface 73b of the guide rib 73, adjacent to the opening 16, in the air flow.

Other configurations of this embodiment are the same as those of the second embodiment. Thus, similar advantages to those of the second embodiment can be obtained. Further, according to the present embodiment, the following effects can be obtained.

Also in this embodiment, the filter 12 is attached/detached by the same procedure as in the first embodiment. At this time, the upper end surface of the draining rib 71 comes into contact with the side surface of the filter 12. As described above, the width dimension of the draining rib 71 in the thickness direction of the filter 12 is smaller than the thickness dimension of the filter 12. Therefore, the contact area between the filter 12 and the case 11 can be reduced as compared with the case where the entire filter lower region 61 is in contact with the filter 12. Therefore, the frictional resistance at the time of attaching/detaching the filter can be reduced.

Further, according to the present embodiment, due to the draining rib 71, a space can be formed between the filter 12 and the case bottom surface 113 such that the water falls from the filter 12. Therefore, the water can be removed from the filter 12. As a result, it is possible to suppress an offensive odor caused by the filter 12 being constantly wet. Further, the draining rib 71 can suppress wind leakage from between the filter 12 and the case bottom surface 113.

Unlike the present embodiment, it is assumed that the catch prevention rib 72 is not provided. The draining rib 71 is separated from the service portion region 62, and there is a recess between the service section region 62 and the draining rib 71. Therefore, when the filter 12 is moved to the deep side while the filter 12 is in contact with the second inclined surface 27 during the insertion of the filter 12, the filter 12 is caught by the draining rib 71.

In contrast, according to the present embodiment, the catch prevention rib 72 is provided between the service portion region 62 and the draining rib 71. Therefore, it is possible to prevent the filter 12 from being caught by the draining rib 71 when the filter 12 is inserted. The service portion region 62, the upper end surface of the catch prevention rib 72, and the upper end surface of the draining rib 71 may form the same plane inclined with respect to the vertical direction.

Further, as shown in FIG. 14, the draining rib 71 has cutouts 71c for passing water at arbitrary positions, and the guide rib 73 has cutouts 73c for passing water at arbitrary positions. The cutout 71c, 73c is a rib non-forming region of the rib 71, 73 in the extending direction of the rib 71, 73. The cutouts 71c, 73c allow the water that has fallen into the filter lower region 61 to flow along the case bottom surface 113 to the downstream side of the filter 12 in the air flow.

Sixth Embodiment

Figure 18:
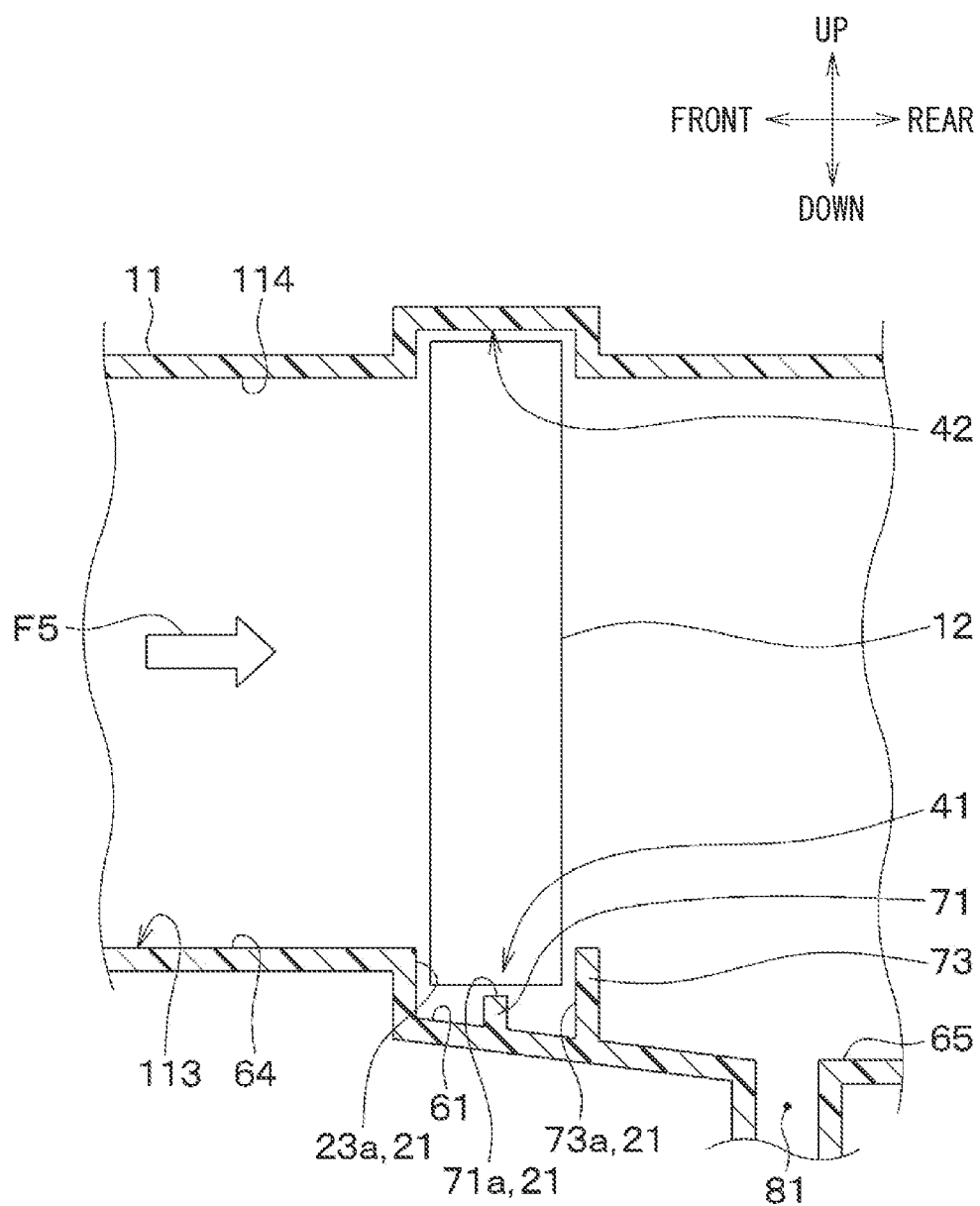
FIG. 18 is a cross-sectional view illustrating an air conditioner for a vehicle according to a sixth embodiment, corresponding to FIG. 15.

As shown in FIG. 18, in the present embodiment, in the configuration of the fifth embodiment, the filter lower region 61 of the case bottom surface 113 is inclined. Specifically, the filter downstream region 65 of the case bottom surface 113 has a drainage port 81 for draining the water from the case 11 to the outside. The filter lower region 61 is inclined so as to become lower toward the downstream side in the air flow. That is, the filter lower region 61 is inclined so that the side closer to the drainage port 81 is lower than the side farther from the drainage port 81.

Accordingly, the water that has fallen from the filter 12 to the filter lower region 61 easily flows toward the drainage port 81. Therefore, the drainage property can be improved as compared with the case where the filter lower region 61 is horizontal. The other configurations of this embodiment are the same as those of the fifth embodiment. Thus, similar advantages to those of the fifth embodiment can be obtained.

Seventh Embodiment

Figure 19:
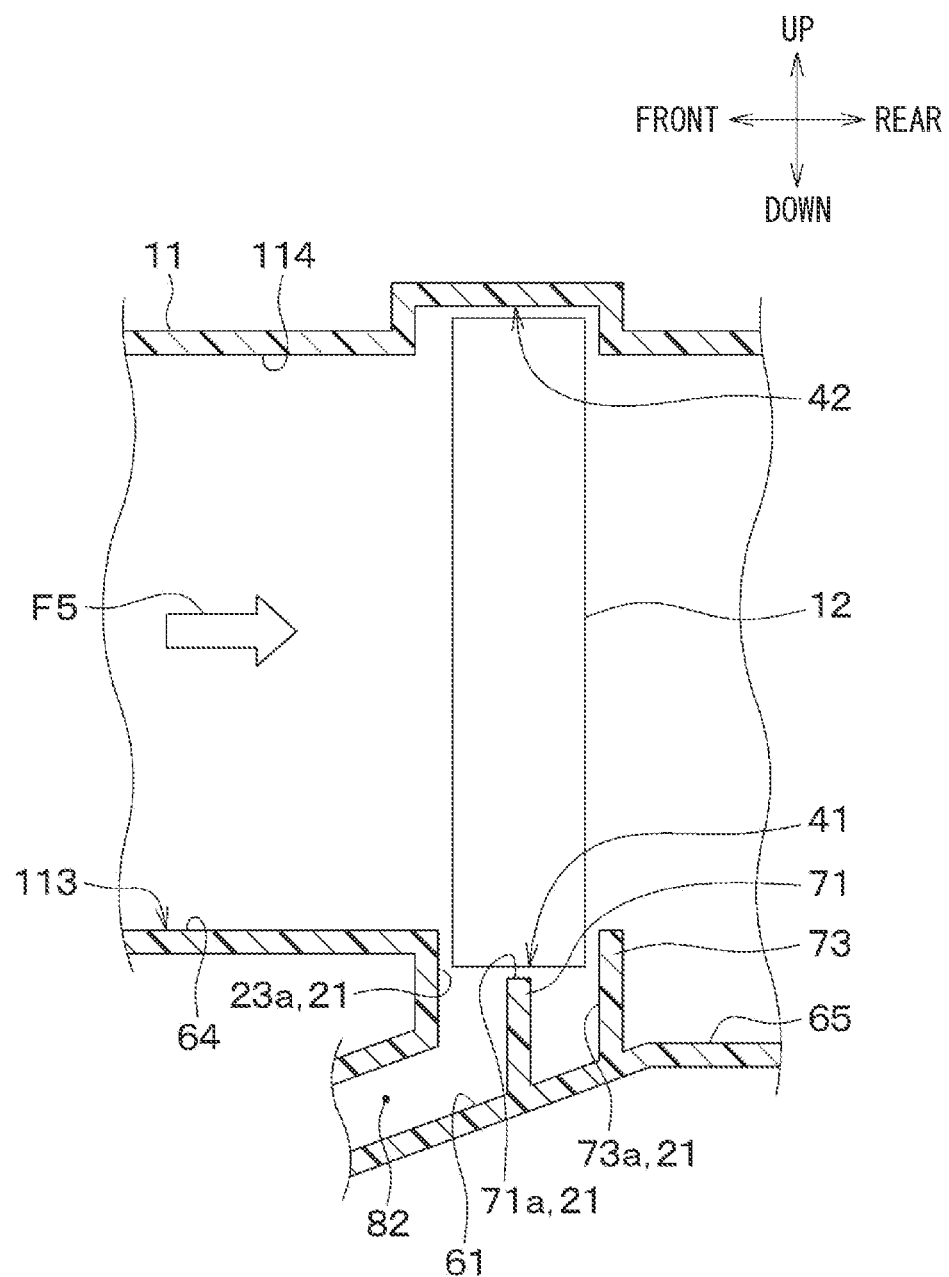
FIG. 19 is a cross-sectional view illustrating an air conditioner for a vehicle according to a seventh embodiment, corresponding to FIG. 15.

As shown in FIG. 19, in the present embodiment, in the configuration of the fifth embodiment, the filter lower region 61 of the case bottom surface 113 is inclined. Specifically, the case bottom surface 113 has a drainage port 82 on the upstream side of the filter lower region 61 in the air flow. The filter lower region 61 is inclined so as to become lower toward the upstream side in the air flow. That is, the filter lower region 61 is inclined so that the side closer to the drainage port 82 is lower than the side farther from the drainage port 82. Thus, similar advantages to those of the sixth embodiment can be obtained. In the sixth embodiment and the present embodiment, a part of the filter lower region 61 may be horizontal. In short, at least a part of the filter lower region 61 may be inclined so that the side closer to the drainage port 81, 82 is lower than the side farther from the drainage port 81, 82.

Other Embodiments (1) In the third embodiment, the rib upstream region 113b of the case bottom surface 113 is inclined over the entire range from the opening 16 to the positioning portion 21. However, the rib upstream region 113b may be partially horizontal. In short, at least a part of the rib upstream region 113b may be inclined so as to be lowered from the opening 16 toward the positioning portion 21. In this case, the effect of the third embodiment can be obtained.

Further, in the third embodiment, the rib upstream region 113b is inclined, so that the rib upstream region 113b is at a position higher than the positioning upstream region 113c. However, if the rib upstream region 113b is at a position higher than the positioning upstream region 113c, the rib upstream region 113b may not be inclined. That is, there may be a step between the rib upstream region 113b and the positioning upstream region 113c so that the rib upstream region 113b is horizontal and located higher than the positioning upstream region 113c.

Further, not the entire range of the rib upstream region 113b from the opening 16 to the positioning portion 21, but only a part of the rib upstream region 113b adjacent to the opening 16 is at a position higher than the positioning upstream region 113c. Accordingly, the water flowing on the case bottom surface 113 flows to the lower side. Therefore, water is more likely to flow in the positioning upstream region 113c than in the rib upstream region 113b. Water can flow into the filter 12 from the positioning upstream region 113c.

Further, in the third embodiment, the positioning upstream region 113c of the case bottom surface 113 is continuously inclined over the entire range from a position upstream of the positioning portion 21 to a position adjacent to the positioning portion 21. However, a part of the positioning upstream region 113c may be horizontal. In short, at least a part of the positioning upstream region 113c may be inclined so as to become lower toward the downstream side in the air flow. In this case, the effect of the third embodiment can be obtained.

Further, in the third embodiment, since the positioning upstream region 113c is inclined, the upstream portion of the positioning upstream region 113c is at a higher position than the downstream portion of the positioning upstream region 113c. However, if the upstream portion of the positioning upstream region 113c is higher than the downstream portion of the positioning upstream region 113c, the positioning upstream region 113c may not have to be inclined. That is, a step may be formed between the upstream portion of the positioning upstream region 113c and the downstream portion of the positioning upstream region 113c, such that the upstream portion of the positioning upstream region 113c is higher than the downstream portion of the positioning upstream region 113c.

(2) In each of the embodiments, the upstream guide surface 23b of the service portion 22 has a convex shape toward the upstream side in the air flow. However, the upstream guide surface 23b may have another shape. For example, the upstream guide surface 23b may have a shape parallel to the filter 12. Even in this case, the distance between the upstream guide surface 23b and the filter 12 in the service portion 22 in the filter mounted state is wider than the distance between the upstream guide surface 23a and the filter 12 in the positioning portion 21, so as to raise the degree of freedom in the posture of the filter 12 at the time of attachment/detachment. That is, the posture of the filter 12 at the time of attachment/detachment can be made different from the posture of the filter 12 in the filter mounted state.

(3) The present disclosure is not limited to the foregoing description of the embodiments and can be modified. The present disclosure may also be varied in many ways. Such variations are not to be regarded as departure from the disclosure, and all such modifications are intended to be included within the scope of the disclosure. The above-described embodiments are not unrelated to each other, and can be appropriately combined unless the combination is clearly impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

According to the first aspect shown in part or all of the embodiments, the air conditioner for a vehicle includes a case that forms an air passage inside and a filter disposed inside the case so as to cross the air passage. The case has an opening for attaching/detaching the filter to/from the case, and a guide unit to guide a movement of the filter when the filter is being detached from/attached to the case and to hold the filter during a mounted state while the filter is attached to the case. The guide unit is provided on an inner wall surface of the case. The guide unit has: a positioning portion distanced from the opening to determine a position of the filter in the mounted state; and a service portion located between the positioning portion and the opening to increase a flexibility in a posture of the filter when the filter is being detached from/attached to. Each of the positioning portion and the service portion has: an upstream guide surface to be in contact with an upstream portion of the filter when the filter is being attached or detached, or in the mounted state; a downstream guide surface to be in contact with a downstream portion of the filter when the filter is being attached or detached or in the mounted state; and a side guide surface to be in contact with a side portion of the filter when the filter is being attached or detached, or in the mounted state. The inner wall surface of the case has an upstream inner surface upstream of the guide unit in a flow of air. A position of the side guide surface is located outward of the upstream inner surface. A distance between the upstream guide surface of the service portion and the filter is wider than a distance between the upstream guide surface of the positioning portion and the filter in the mounted state. The case has a water prevention rib protruding from the inner wall surface so as to extend in a direction intersecting a flow of air at a position of the upstream inner surface upstream of the service portion in a flow of air.

Further, according to the second aspect, the inner wall surface includes a case bottom surface located on the lower side of the case and a case upper surface located on the upper side of the case. The guide unit includes a lower guide unit provided on the bottom surface of the case and an upper guide unit provided on the upper surface of the case. The filter is mounted inside the case so that the extending direction of the filter is along the vertical direction. The water prevention rib is a lower water prevention rib provided on the case bottom surface at a position upstream of the service portion of the lower guide unit in the air flow. In this way, the first aspect can be applied to an air conditioner for a vehicle in which the filter is vertically installed and mounted inside the case.

Further, according to the third aspect, the water prevention rib is not provided on the case upper surface in the second aspect.

In the air conditioner in which the filter is installed vertically, when water enters the case from the outside of the vehicle, the water often flows along the case bottom surface rather than flowing along the case top surface. Therefore, as in the third aspect, by providing the water prevention rib only on the case bottom surface, not on the case top surface, the water can be made to pass through the filter. Further, it is possible to reduce the ventilation resistance due to the water prevention ribs as compared with the case where the water prevention ribs are provided on each of the two inner wall surfaces facing each other.

Further, according to the fourth aspect, the case bottom surface has a positioning upstream region upstream of the positioning portion of the lower guide unit in the air flow in the second and third aspects. The water prevention rib is not provided in the positioning upstream region.

Accordingly, the water that has reached the water prevention rib along the case bottom surface can flow into the filter from the positioning upstream region. In the positioning portion, the gap between the upstream guide surface and the filter is small in the filter mounted state. Therefore, the water flowing from the positioning upstream region toward the filter along the case bottom surface can flow into the filter.

Further, according to the fifth aspect, the case bottom surface includes a rib upstream region upstream of the rib in the air flow. A part of the rib upstream region adjacent to the opening is located higher than the positioning upstream region. Accordingly, the water flowing on the case bottom surface flows to the lower side. Therefore, water is more likely to flow in the positioning upstream region than in the rib upstream region. Water can flow into the filter from the positioning upstream region.

Further, according to the sixth aspect, at least a part of the rib upstream region is inclined so as to be lowered from the opening toward the positioning portion in the fifth aspect.

Accordingly, the water flowing along the case bottom surface toward the service portion can be guided from the rib upstream region to the positioning upstream region. Therefore, it is possible to promote the water flowing along the case bottom surface to pass through the filter.

Further, according to the seventh aspect, the upstream portion of the positioning upstream region is higher than the downstream portion of the positioning upstream region in the fourth to sixth aspects. Accordingly, the water that has reached the positioning upstream region easily flows toward the filter. Therefore, it is possible to promote the water flowing along the case bottom surface to pass through the filter.

Further, according to the eighth aspect, at least a part of the positioning upstream region is inclined so as to become lower toward the downstream side in the air flow in the seventh aspect. Accordingly, the water that has reached the positioning upstream region easily flows toward the filter. Therefore, it is possible to promote the water flowing along the case bottom surface to pass through the filter.

Further, according to the ninth aspect, the case bottom surface includes a filter lower region located under the filter in the filter mounted state in the second to eighth aspects. The case has a draining rib protruding from the case bottom surface in the filter lower region. The draining rib extends from the opening in the filter lower region toward the opposite side of the opening. The width dimension of the draining rib in the thickness direction of the filter in the filter mounted state is smaller than the thickness dimension of the filter.

Accordingly, the draining rib can form a space between the filter and the case bottom surface where the water falls from the filter. Therefore, the filter can be drained. As a result, it is possible to suppress an offensive odor caused by the filter being constantly wet.

Further, according to the tenth aspect, the case bottom surface has a service portion region forming a part of the side guide surface of the service portion at a position upstream of the filter in a flow of air in the mounted state. The case has a catch prevention rib protruding from the case bottom surface in the filter lower region. The catch prevention rib is connected to both the service portion region and the draining rib at a position between the service portion region and the draining rib. The upper end surface of the catch prevention rib constitutes the same plane as each of the service portion region and the upper end surface of the draining rib.

If the catch prevention rib is not provided, the draining rib is separated from the service portion region and there is a recess between the service portion region and the draining rib. Therefore, when the filter is inserted, the filter is caught by the draining rib. In contrast, according to this aspect, the catch prevention rib is provided between the service portion region and the draining rib. Therefore, it is possible to prevent the filter from being caught by the draining rib when the filter is inserted.

Further, according to the eleventh aspect, a drain port for draining the water out of the case is provided on the case bottom surface in the ninth and tenth aspects. At least a part of the filter lower area is tilted so that the side closer to the drain port is lower than the side farther from the drain port.

Accordingly, the water that has fallen from the filter to the filter lower region easily flows toward the drain port. Therefore, the drainage property can be improved as compared with the case where the filter lower region is horizontal.

What is claimed is:
1. An air conditioner for a vehicle comprising:
a case in which an air passage is formed; and
a filter arranged inside the case to cross the air passage, wherein
the case has an opening for attaching/detaching the filter to/from the case,
the case has a guide unit to guide a movement of the filter when the filter is being detached from/attached to the case and to hold the filter in a filter mounted state where the filter is mounted in the case, the guide unit being provided on an inner wall surface of the case,
the guide unit has
a positioning portion distanced from the opening to determine a position of the filter in the filter mounted state, and
a service portion located between the positioning portion and the opening to increase a flexibility in a posture of the filter when the filter is being detached from/attached to,
each of the positioning portion and the service portion has
an upstream guide surface to be in contact with an upstream portion of the filter when the filter is being attached or detached or in the filter mounted state,
a downstream guide surface to be in contact with a downstream portion of the filter when the filter is being attached or detached or in the filter mounted state, and
a side guide surface to be in contact with a side portion of the filter when the filter is being attached or detached or in the filter mounted state,
the inner wall surface of the case has an upstream inner surface upstream of the guide unit in a flow of air,
a position of the side guide surface is located outward of the upstream inner surface,
a distance between the upstream guide surface of the service portion and the filter is wider than a distance between the upstream guide surface of the positioning portion and the filter in the filter mounted state,
the case has a water prevention rib protruding from the upstream inner surface so as to extend in a direction intersecting a flow of air at a position upstream of the service portion in a flow of air, the inner wall surface has a case bottom surface located on a lower side of the case and a case upper surface located on an upper side of the case, the guide unit has a lower guide provided on the case bottom surface and an upper guide provided on the case upper surface, the filter is mounted inside the case so that an extending direction of the filter is along a vertical direction, and the water prevention rib is a lower rib provided on the case bottom surface at a position upstream of the service portion of the lower guide in a flow of air.

2. The air conditioner according to claim 1, wherein no rib is provided on the case upper surface.

3. The air conditioner according to claim 1, wherein the case bottom surface has a positioning upstream region upstream of the positioning portion of the lower guide in a flow of air, and no rib is provided in the positioning upstream region.

4. The air conditioner according to claim 3, wherein the case bottom surface has a rib upstream region upstream of the water prevention rib in a flow of air, and a part of the rib upstream region adjacent to the opening is located at a position higher than the positioning upstream region.

5. The air conditioner according to claim 4, wherein at least a part of the rib upstream region is inclined so as to be lowered from the opening toward the positioning portion.

6. The air conditioner according to claim 3, wherein the positioning upstream region has an upstream portion and a downstream portion downstream of the upstream portion in a flow of air, and the upstream portion of the positioning upstream region is located at a position higher than the downstream portion of the positioning upstream region.

7. The air conditioner according to claim 6, wherein at least a part of the positioning upstream region is inclined so as to be lowered toward a downstream side in a flow of air.

8. The air conditioner according to claim 1, wherein the case bottom surface has a filter lower region located below the filter in the filter mounted state, the case has a draining rib protruding from the case bottom surface in the filter lower region, the draining rib extends away from the opening in the filter lower region, and a width dimension of the draining rib in a thickness direction of the filter is smaller than a thickness dimension of the filter in the filter mounted state.

9. The air conditioner according to claim 8, wherein the case bottom surface has a service portion region forming a part of the side guide surface of the service portion at a position upstream of the filter in a flow of air in the filter mounted state, the case has a catch prevention rib protruding from the case bottom surface in the filter lower region, the catch prevention rib is connected to both the service portion region and the draining rib at a position between the service portion region and the draining rib, and an upper end surface of the catch prevention rib is flush with the service portion region and an upper end surface of the draining rib.

10. The air conditioner according to claim 8, wherein the case bottom surface has a drain port for draining water out of the case, and at least a part of the filter lower region is inclined so as to be lowered toward the drain port.

* * * * *